(12) United States Patent
Ohkuma et al.

(10) Patent No.: US 7,209,556 B2
(45) Date of Patent: Apr. 24, 2007

(54) ENCRYPTION APPARATUS AND METHOD, AND DECRYPTION APPARATUS AND METHOD BASED ON BLOCK ENCRYPTION

(75) Inventors: Kenji Ohkuma, Yokohama (JP); Hirofumi Muratani, Kawasaki (JP); Shinichi Kawamura, Kodaira (JP); Fumihiko Sano, Fuchu (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 20 days.

(21) Appl. No.: 11/261,562

(22) Filed: Oct. 31, 2005

(65) Prior Publication Data
US 2007/0058805 A1 Mar. 15, 2007

Related U.S. Application Data

(63) Continuation of application No. 09/799,028, filed on Mar. 6, 2001.

(30) Foreign Application Priority Data

Mar. 6, 2000 (JP) ............................. 2000-060482
Jul. 11, 2000 (JP) ............................. 2000-210484

(51) Int. Cl.
*H04K 1/04* (2006.01)
*H04L 9/00* (2006.01)
*H04L 9/28* (2006.01)

(52) U.S. Cl. ..................... 380/37; 713/189; 380/36; 380/42; 380/44; 380/46

(58) Field of Classification Search ............... None
See application file for complete search history.

(56) References Cited

U.S. PATENT DOCUMENTS 3,798,359 A * 3/1974 Feistel ..................... 380/37

(Continued)

FOREIGN PATENT DOCUMENTS

WO    WO 97/09705    3/1997

OTHER PUBLICATIONS

Heys et al, "Avalanche Characteristics of Substitution-Permutation Encryption Networks", IEEE Transactions on Computers, vol. 44, No. 9, Sep. 1995.*

(Continued)

*Primary Examiner*—Kim Vu
*Assistant Examiner*—Ponnoreay Pich
(74) *Attorney, Agent, or Firm*—Oblon, Spivak, McClelland, Maier & Neustadt, P.C.

(57) ABSTRACT

An encryption apparatus for block data, comprises a first processing unit randomizing the block data in units of first portions obtained by dividing the block data, and a second processing unit diffusing the block data output from the first processing unit with respect to a second portion of the block data which is wider than the first portion. The first processing unit comprises first nonlinear processing units nonlinearly transforming the block data in units of the first portions. The second processing unit comprises a first linear diffusion processing unit linearly diffusing the second portion of the block data. At least one of the first nonlinear processing units comprises second nonlinear processing units nonlinearly transforming the block data in units of the first portions, and a second linear diffusion processing unit linearly diffusing the second portion of the block data.

11 Claims, 23 Drawing Sheets

U.S. PATENT DOCUMENTS 5,870,477 A * 2/1999 Sasaki et al. ............... 713/165
2002/0016773 A1 2/2002 Ohkuma et al.

OTHER PUBLICATIONS

K. Ohkuma, et al. Selected Areas in Cryptography 2000. Lecture Notes in Computer Science, vol. 2012, pp. 72-88, XP-0022166990, "The Block Cipher Hierocrypt", Aug. 15, 2000.

V. Rijment, et al., "The Cipher SHARK", Fast Software Encryption, LNCS 1039, Ogs 99-111, 1996.

J. Daemen, et al., "The Block Cipher Square", Fast Software Encryption, LNCS 1267, pp. 1490165, 1997.

J. Daemen, et al., "AES Proposal Rijndael", Document Version 2, Mar. 9, 1999, pp. 1-45.

H.M. Heys, et al., Electronics Letters, vol. 29, No. 1, pp. 40-41, "Cryptanalysis of Tree-Structured Substitution-Permutation Networks", Jan. 7, 1993.

B. Schneier, et al., http://www.counterpane.com/twofish.html, pp. 1-68, Twofish: A 128-Bit Block Cipher α, >>, Jun. 15, 1998.

A. M. Youssef, et al., http://www.scs.carleton.ca/-sac97/program/papers.html, http://www.ncf.Carleton.ca/-cf744, 9 pages, "On the Design of Linear Transformations for Substitution Permutation Encryption Networks", Aug. 11, 1997.

E. Biham, et al., Lecture Notes in Computer Science, vol. 1372, pp. 222-238, "Serpent: A New Block Cipher Proposal", Apr. 13, 1998.

Kazumaro Aoki, et al., "Stricter Evaluation for the Maximum Average of Differential Probability and the Maximum Average of Linear Probability", SCIS 96-4A, pp. 1-11, 1996.

Mitsuru Matsui, "Block Encryption Algorithm MISTY", ISEC 96-11, pp. 1-14, 1996.

Hideo Shimizu et al., "On the Diffusion Layer of Block Ciphers", Technical Report of IEICE, ISEC99-72 (Nov. 1999).

* cited by examiner

```
s[256]={
    72 AA 49 16 1E 3A 43 AE 66 BC 00 73 79 3B FB 9F
    69 6A A2 50 6E F5 EF AC 22 02 AD 26 E2 DF 97 F0
    9E BF 17 8B FA 7C F4 71 7F CA F6 52 FD C3 E5 64
    53 8D E0 F3 0F 78 CB 9B 68 3C 0D 1F 89 B6 EB F7
    44 4A 06 A6 56 6B 85 01 30 88 51 31 9C A0 A3 25
    60 5B FF 05 B7 91 15 B3 A9 20 03 2B 61 42 95 4D
    F9 7E 0E E9 D8 F1 46 99 CE BE D9 54 80 B0 D2 4F
    7A E8 35 92 1B 7B 12 D6 4C D5 E7 EE B1 24 DE 21
    04 10 AB 29 9A 81 FE A7 B8 63 28 0A 8A D1 C6 07
    B9 C8 98 82 74 9D 84 47 94 C7 6C 11 D7 BA C1 C9
    DD 77 39 2F 2E C2 67 41 E4 58 34 CD 1C 93 96 7D
    2C F8 B5 70 14 08 DC CC 87 D0 5E 32 C5 C4 59 3E
    CF 55 5C 23 75 2D 2A 86 4B 1D 5F E6 FC B2 4E 09
    27 AF 19 B4 BD 6D 3D 6F ED 62 EA F2 D3 36 38 DB
    BB 83 45 37 A4 EC 8C 5D E1 33 90 A1 40 8E 1A A5
    0B 3F 5A DA 13 76 0C C0 48 E3 65 A8 18 8F D4 57 }
```
FIG. 5    112
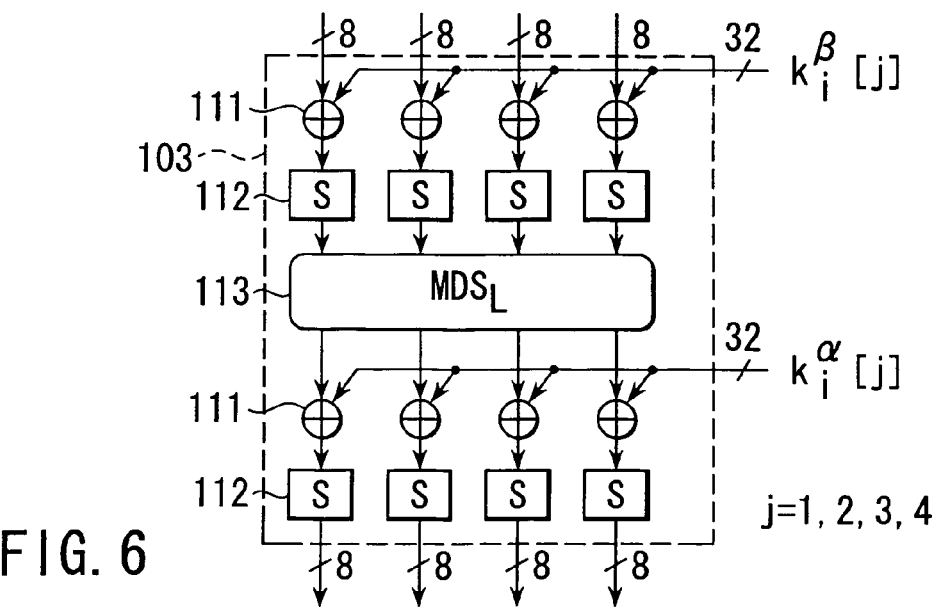
FIG. 6    $j=1, 2, 3, 4$

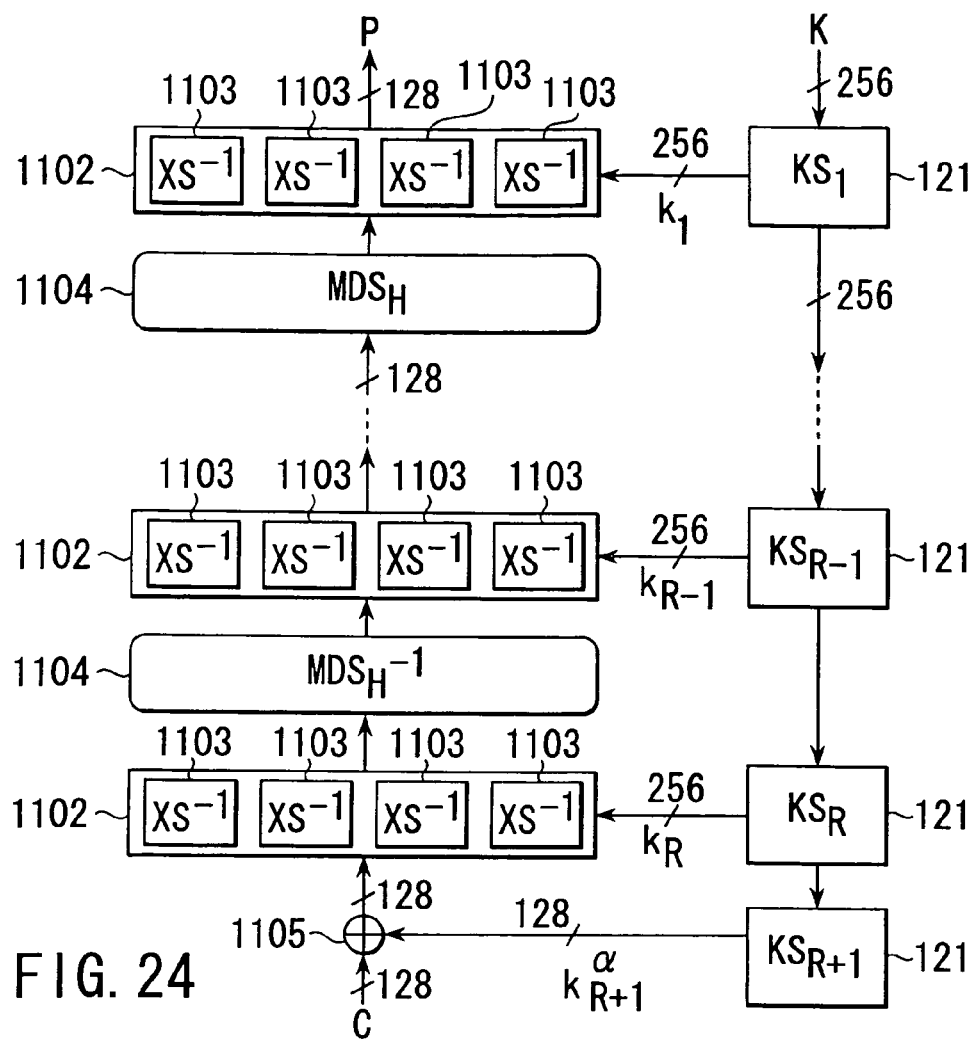
FIG. 24
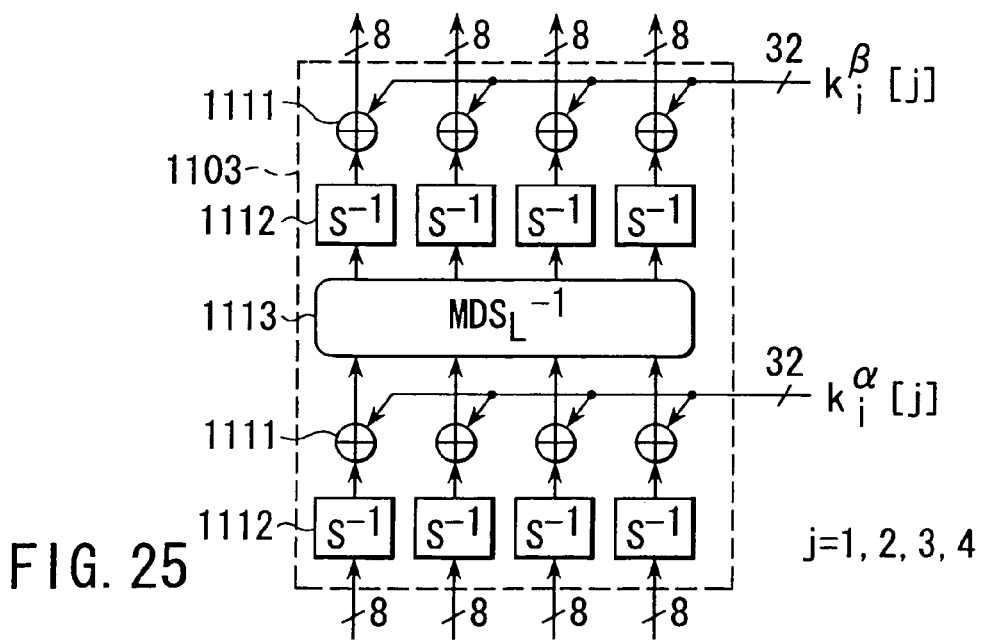
FIG. 25  j=1, 2, 3, 4

ENCRYPTION APPARATUS AND METHOD, AND DECRYPTION APPARATUS AND METHOD BASED ON BLOCK ENCRYPTION

CROSS-REFERENCE TO RELATED APPLICATIONS

This application is a continuation of U.S. patent application Ser. No. 09/799,028 filed Mar. 6, 2001, and is based upon and claims the benefit of priority from the prior Japanese Patent Application No. 2000-060482, filed Mar. 6, 2000; and No. 2000-210484, filed Jul. 11, 2000. The entire contents of these applications are incorporated herein by reference.

BACKGROUND OF THE INVENTION

The present invention relates to an encryption apparatus and method, and a decryption apparatus and method based on block encryption scheme, and an operating unit used in the encryption and decryption apparatuses.

Typical fundamental structures of common key block encryption scheme include SPN type and Feistel type. For both structures, a design method for improving strength evaluation and resiliency against differential/linear cryptanalysis have been studied (reference [1] V. Rijmen, J. Daemen, B. Preneel, A. Bosselaers & E. Dcwin, "The Cipher SHARK," Fast Software Encryption, LNCS 1039, 1996, reference [2] Kazumaro Aoki, Kazuo Ota, "More Strict Evaluation of Maximum Mean Differential Probability and Maximum Mean Linear Probability," SCIS 96-4A, 1996, reference [3], Mitsuru Matsui, "Block encryption scheme MISTY," ISEC 96-11, 1996).

With the SPN structure, since the number of active S-boxes can be guaranteed, the number of stages for achieving the set strength can be easily determined (reference [1]). However, when the block size increases, and the parallelness of S-boxes becomes high, the process of diffusion layers becomes complicated, resulting in low speed.

SQUARE/Rijndael Cipher can solve this problem (reference [4] J. Daemen, L. R. Knudsen & V. Rijmen, "The Block encryption scheme Square," Fast Software Encryption, LNCS 1267, 1997, reference [5] J. Daemen & V. Rijmen, "AES Proposal: Rijndael, "http://www.east.kuleuven.ac.be/rijmen/rijdael/rijndaeldocV2.zip).

In cipher of this type, 16 parallel S-boxes are arranged in a 4×4 matrix to limit linear diffusion within a single column, thus reducing the processing load. By combining rearrangement of byte positions with linear diffusion, the influence of one byte in a given stage is diffused to all bytes two stages later, and 25 or more active S-boxes in four stages (robust against differential/linear cryptanalysis) are achieved.

However, since bytes in a single column do not mix in the next stage, dedicated attack called SQUARE attack is present (reference [1], reference [5]). This results from achievement of both high strength and efficiency under the restriction of only one type of diffusion layers.

The SPN structure allows easy estimation of the lower limit of the number of active S-boxes, and can be designed to guarantee high strength against differential/linear cryptanalysis. However, when the parallelness of S-boxes becomes higher with increasing block size of plaintext/ciphertext, the calculation cost of a coupling portion of diffusion layers becomes high. Also, uniform data diffusion cannot be attained depending on the design of diffusion layers.

BRIEF SUMMARY OF THE INVENTION

Accordingly, the present invention is directed to method and apparatus that substantially obviates one or more of the problems due to limitations and dis-advantages of the related art.

In accordance with the purpose of the invention, as embodied and broadly described, the invention is directed to an apparatus for encrypting block data, comprising a first processing unit configured to randomize the block data in units of first portions obtained by dividing the block data, and a second processing unit configured to diffuse the block data output from the first processing unit with respect to a second portion of the block data which is wider than the first portion.

Also, in accordance with the present invention, there is provided an method of encrypting block data, comprising randomizing the block data in units of first portions obtained by dividing the block data, and diffusing the randomized block data with respect to a second portion of the block data which is wider than the first portion.

According to the present invention, there is provided an apparatus for decrypting encrypted block data, comprising a first processing unit configured to randomize the encrypted block data in units of first portions obtained by dividing the encrypted block data, and a second processing unit configured to diffuse the encrypted block data output from the first processing unit with respect to a second portion of the encrypted block data which is wider than the first portion.

According to the present invention, there is provided an article of manufacture comprising a computer usable medium having computer readable program code means embodied therein, the computer readable program code means comprising first computer readable program code means for causing a computer to randomize the encrypted block data in units of first portions obtained by dividing the encrypted block data, and second computer readable program code means for causing a computer to diffuse the encrypted block data output from the first processing unit with respect to a second portion of the encrypted block data which is wider than the first portion.

According to the present invention, there is provided an arithmetic operation device for a block data encryption apparatus which device diffuses block data using a Maximum Distance Separable matrix, the device comprising: a multiplier configured to multiply corresponding bits of first portions obtained by dividing the block data and an element of the Maximum Distance Separable matrix without feeding back an overflow; a lookup table configured to store data indicating a relation between predetermined upper bits and a return word for adjusting the overflow; and an EX-OR circuit configured to read out the return word based on the predetermined upper bits and EX-OR the read return word and an output of the multiplier.

According to the present invention, an encryption apparatus and method, and a decryption apparatus and method achieves uniform diffusion while suppressing calculation cost.

BRIEF DESCRIPTION OF THE SEVERAL VIEWS OF THE DRAWING

FIG. 5 shows an example of an S-box;

FIG. 6 shows an example of the internal arrangement of an extended S-box;

FIG. 24 is a block diagram showing an example of the arrangement of a decryption apparatus;

FIG. 25 shows an example of the internal arrangement of the inverse transform of an extended S-box;

DETAILED DESCRIPTION OF THE INVENTION

A preferred embodiment of an encryption apparatus and method, and a decryption apparatus and method based on block encryption scheme, and an operating unit used in the encryption and decryption apparatuses according to the present invention will now be described with reference to the accompanying drawings.

In the embodiment, nested (recursive) SPN encryption as a combination of local randomization (lower-level diffusion) and diffusion over the block width (higher-level diffusion) will be explained. In the following description, encryption will be mainly explained, and decryption will then be explained. Note that a decryption algorithm is an inverse transform of an encryption algorithm, and a key is a secret key common to encryption and decryption. The encryption system of this embodiment can be implemented by either hardware or software, and an arrangement example to be described below can be achieved as a functional block diagram of an encryption apparatus (decryption apparatus) or a functional module diagram of an encryption algorithm (decryption algorithm).

Figure 1:
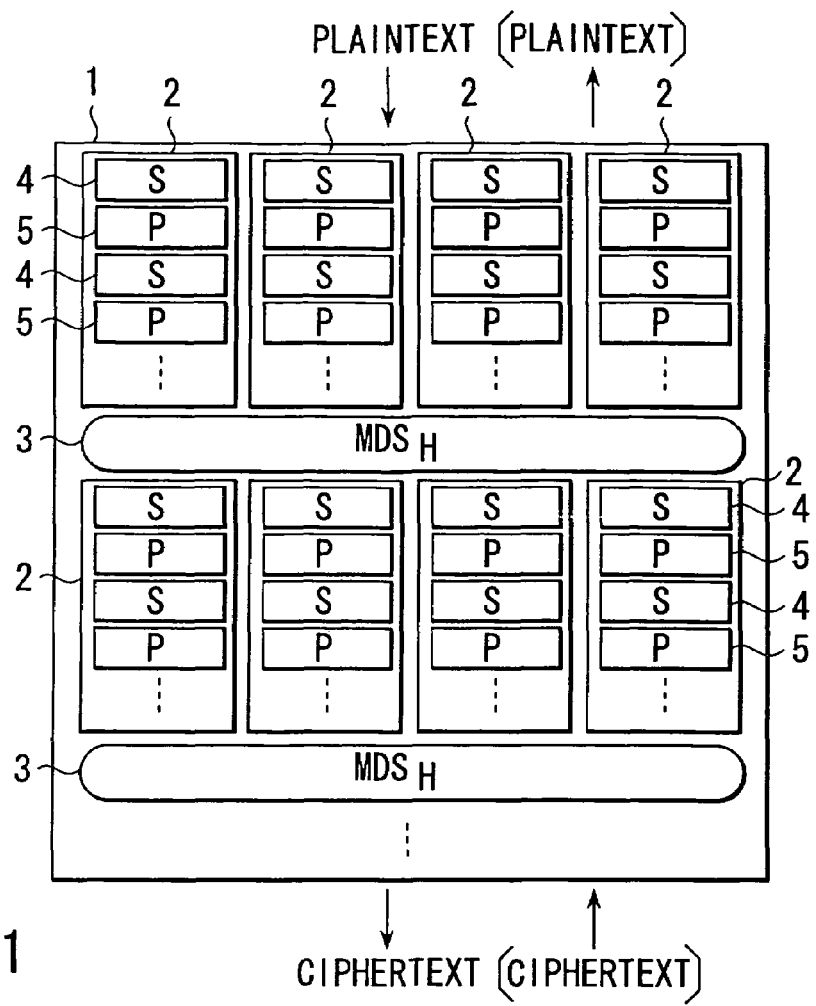
FIG. 1 is a view for explaining the basic configuration of encryption according to the first embodiment of the present invention.

FIG. 1 shows an example of the basic configuration of nested SPN encryption (an encryption (or decryption) apparatus or encryption (or decryption) algorithm, an encryption processing apparatus).

As shown in FIG. 1, in the nested SPN structure, each of a plurality of parallel nonlinear transformation modules (extended S-boxes in an example to be described later) 2 in each stage executes local, lower-level diffusion, a diffusion module (a higher-level MDS in an example to be described later) 3 executes broad, higher-level diffusion over the block width, the nonlinear transformation modules 2 execute local, lower-level diffusions, . . . , and this process is repeated at a predetermined number of stages. Each nonlinear transformation module 2 is constructed by alternately arranging nonlinear transformation modules (S-boxes in an example to be described later) and diffusion modules (lower-level MDS in an example to be described later). That is, in the nested SPN structure of this embodiment, lower-level SPN structures (two stages of SPN structures in an example to be described later) are recursively embedded in S-box portions of the normal SPN structure.

According to such nested SPN structure, the branch number can be hierarchically guaranteed (hierarchy of the branch number), and the lower limit of the number of active S-boxes can also be easily guaranteed. In the nested SPN structure, strength evaluation can be easily made owing to its simple structure.

In FIG. 1, local, lower-level diffusions are expressed by four parallel linear transformation modules 2. However, the number of parallel modules is not limited to four, but other numbers of parallel modules may be used. Also, the numbers of bits of four parallel nonlinear transformation modules are equal to each other. However, the present invention is not limited to such specific number of bits, and a plurality of nonlinear transformation modules 2 having different numbers of bits may be combined. In this case, all nonlinear transformation modules may have different bit lengths, or some lower-level diffusions may have the same bit length. Also, one type of diffusion module 3 is used. Alternatively, two or more different types of diffusion modules 3 may be used. For example every other diffusion module 3 over the block width may be replaced by two nonlinear transformation modules. Furthermore, in addition to the method that adopts the repetitive structure of identical arrangements, only some arrangements may be replaced.

Moreover, all the nonlinear transformation modules 2 may have the same arrangement or may include different arrangements. The same applies to the diffusion module, nonlinear transformation modules 4, and diffusion module 5. For example, the first input stage and the last output stage may have internal arrangements different from those of other intermediate stages. This embodiment adopts the nested structure of two layers, but may use a nested structure of three or more layers (in case of three layers, each nonlinear transformation module 4 further has an SPN structure). For example, nonlinear transformation modules 2 may have different hierarchical structures. In addition, other variations are available.

This embodiment will be explained below taking 128-bit block encryption scheme equivalent to AES that uses 8-bit S-boxes as an example.

Strength evaluation of block encryption scheme will be explained below.

As an important measure for estimating the encryption strength of a given function f, the maximum differential probability/maximum linear probability is known.

A maximum differential probability $dp^f$ and maximum linear probability $lp^f$ with respect to a function f(x) are respectively given by:

$$dp^f \equiv \max_{\Delta x \neq 0, \Delta y} \left| \frac{\#\{x | f(x) \oplus f(x \oplus \Delta x) = \Delta y\}}{2^n} \right|$$

$$lp^f \equiv \max_{\Gamma x, \Gamma y \neq 0} \left| 2 \frac{\#\{x | x \cdot \Gamma x = f(x) \cdot \Gamma y\}}{2^n} - 1 \right|$$

where $\Delta x$ is the difference of input x, $\Gamma x$ is the mask value of x, and $\Delta y$ is the difference of output y.

In general, it is hard to accurately obtain the maximum differential probability $dp^f$ and maximum linear probability $lp^f$. Hence, security is evaluated here using a maximum differential characteristic probability $DP^f$ and maximum linear characteristic probability $LP^f$ which are approximate values for the maximum differential probability $dp^f$ and maximum linear probability $lp^f$.

In this embodiment, the nested SPN structure is used as an encryption function. The characteristics of an SPS structure as the basic structure of the nested SPN structure will be explained below. Note that SPS indicates a three-layered structure of S-box and diffusion layers S and P like S-P-S. The SPS structure is regarded as the two-stage SPN structure.

In the SPS structure, if $\theta(x)$ represents the output from the diffusion layer in response to input x, the branch number B with respect to differential cryptanalysis is defined by (see reference [1], reference [6], Hideo Shimizu & Toshinobu Kaneko, "Diffusion Layer of Common Key Cipher," SCIS 99-72, 1999):

$$B \equiv \min_{\Delta x \neq 0}(w(\Delta x) + w(\theta(\Delta x)))$$

where w( ) is the Hamming distance using the bit length of an S-box as a code length. S-boxes connected to nonzero input/output differences will be referred to as active S-boxes.

A structure obtained by connecting S-boxes to the input and output of a diffusion layer will be referred to as an SPS structure. If S-boxes are bijections, and at least one input bit to the SPS structure has nonzero difference, the number of active S-boxes is equal to or larger than the branch number (i.e., equal to or larger than B) according to the definition of the branch number. If $p_S$ represents the maximum differential probability of S-boxes, the maximum differential characteristic probability of the SPS structure does not exceed an upper limit value $p_S^B$.

When M parallel S-boxes are used as S layers of the SPS structure, the branch number of diffusion layers that couple them is equal to or smaller than (M+1), and a linear transform in which the branch number satisfies (M+1) is called an MDS (Maximum Distance Separable) matrix.

If the diffusion layers form an MDS matrix, the maximum differential characteristic probability of the SPS structure does not exceed an upper limit value $p_S^{M+1}$ [reference 1]. Likewise, if $q_S$ represents the maximum linear probability of S-boxes, the maximum linear characteristic probability of the SPS structure does not exceed $q_S^{M+1}$.

If a two-stage SPN structure is used as an S-box of a higher-level SPN structure, it is called an extended S-box (lower-level structure). Assume that $M_1$ parallel S-boxes are used, and $B_1$ represents the branch number of diffusion layers in the extended S-box. Given $M_2$ parallel two-stage SPN structures (higher-level structure) for extended S-boxes in which $B_2$ represents the branch number of the diffusion layers, the number of active S-boxes in the higher-level structure does not become smaller than a lower limit value $B_1 \times B_2$. This nature is called hierarchy of the branch number.

If both two types of higher-level and lower-level diffusion layers form MDS matrices, the number of active S-boxes does not become smaller than $(M_1+1) \times (M_2+1)$. In this way, the upper limits of $DP^f$ and $LP^f$ of the nested SPN structure can be suppressed.

Figure 2:
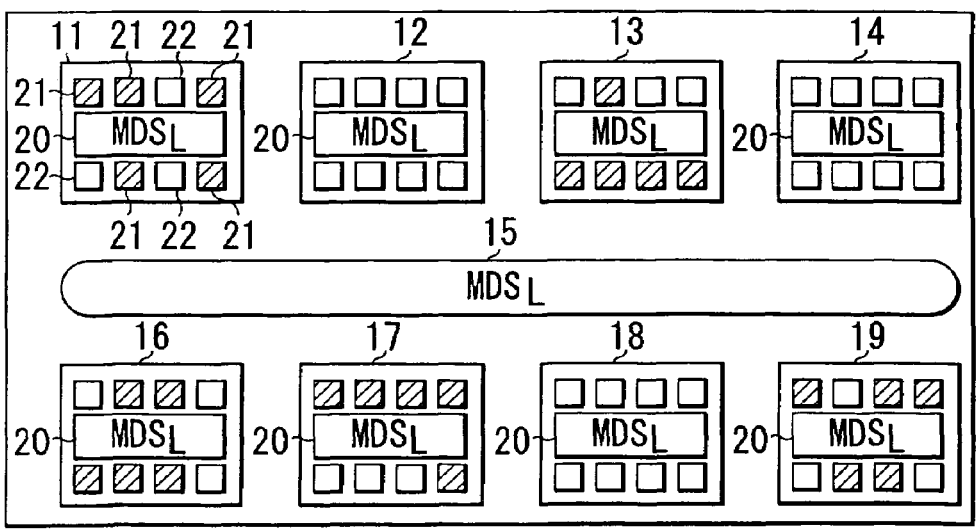
FIG. 2 is a view for explaining an encryption strength.

FIG. 2 shows an example of the two-stage SPN structure when $M_1=M_2=4$. Reference numeral 15 denotes a diffusion part using a higher-level MDS matrix (to be described later); 11 to 14, extended S-boxes at the input side of the diffusion part; and 16 to 19, extended S-boxes at the output side of the diffusion part. In each extended S-box, reference numeral 20 denotes a diffusion part using a lower-level MDS (to be described later). Smallest rectangles 21 and 22 in FIG. 2 respectively indicate input- and output-side S-boxes.

Figure 22:
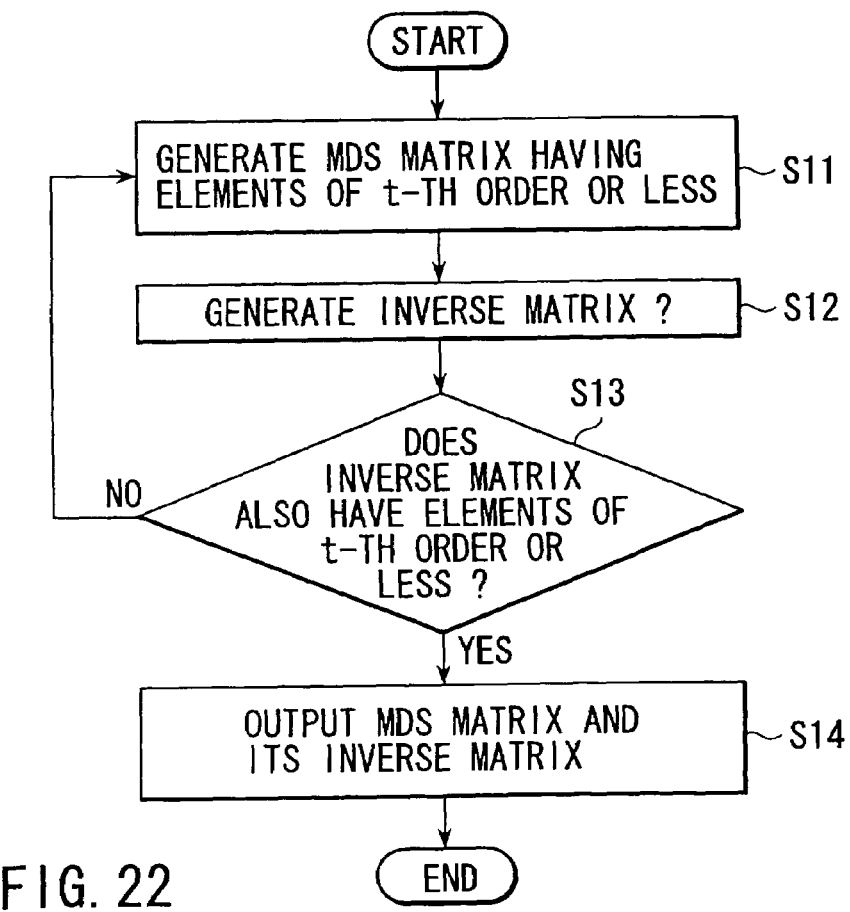
FIG. 22 is a flow chart showing another example of the MDS matrix generation processing sequence.

In FIG. 2, active S-boxes are indicated by hatching (see 21 in FIG. 2), and blank S-boxes indicate zero difference (see 22 in FIG. 22). The extended S-boxes 11, 13, 16; 17, and 19 indicated by bold lines are active extended S-boxes, and other extended S-boxes 12, 14, and 18 indicate zero difference. As can be seen from FIG. 2, the number of active S-boxes in four stage is 25 or more.

As described above, in encryption scheme of this embodiment, 25 (=5×5) or more active S-boxes can be guaranteed by two stages. The maximum differential probability of each S-box is given by:

$P_S = 6/256$

The differential characteristic probability in two stages is given by:

$p_S^{25} = {}_2-135.4 <<_2 -128$

Hence, differential cryptanalysis is not effective.

Likewise, the linear characteristic probability is given by:

$q_S = 22/256$ $q_S^{25} = 2^{-88.5} << 2^{-64}$

Hence, linear cryptanalysis is not effective.

Note that the SQUARE attack applied to conventional SQUARE/Rijndael encryption scheme exploits the characteristics in which when all 28 different patterns are input to one byte in a stage while fixing other inputs, all 28 different patterns appear in respective output bytes after two stages. However, the encryption scheme of this example makes simple application of that attack difficult by improving extendibility among S-boxes by the way the higher-level MDS (to be described later) is taken.

This embodiment will be described in detail below using an example of nested encryption scheme.

An example of the arrangement of this embodiment will be described.

Figure 3:
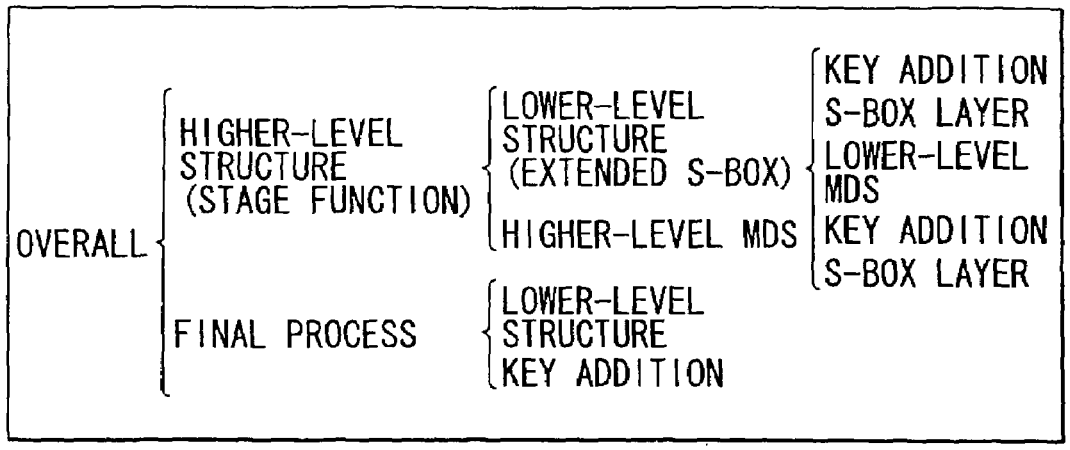
FIG. 3 is a view showing an example of the hierarchical structure of a data randomizing part of nested encryption.

FIG. 3 shows an example of the hierarchical structure of the data randomizing part of nested encryption scheme of this embodiment.

The block length takes 128 bits as an example (of course, the present invention can be practiced for other block lengths). The key length takes 256 bits as an example (of course, the present invention can be practiced for other block lengths). A case wherein the key length=128 bits or 192 bits when the block length=128 bits will be described later.

When a pair of a plurality of parallel extended S-boxes and a higher-level MDS (the final stage does not include any higher-level MDS, as will be described later) is counted as one stage, R represents the number of stages, and R=8 is used in an example. Note that the number of stages is basically not particularly limited. However, the actual number of stages can be appropriately set in consideration of security, computer resources, and the like, and it is more effective to set six or more stages, and more preferably, eight or more stages.

In encryption of this embodiment, since a stage function includes two S-box layers, one stage corresponds to two stages in a normal structure. As for a higher-level MDS in the stage structure, some implementations based on different Galois fields will be explained (strength priority and speed priority examples will be described).

Figure 4:
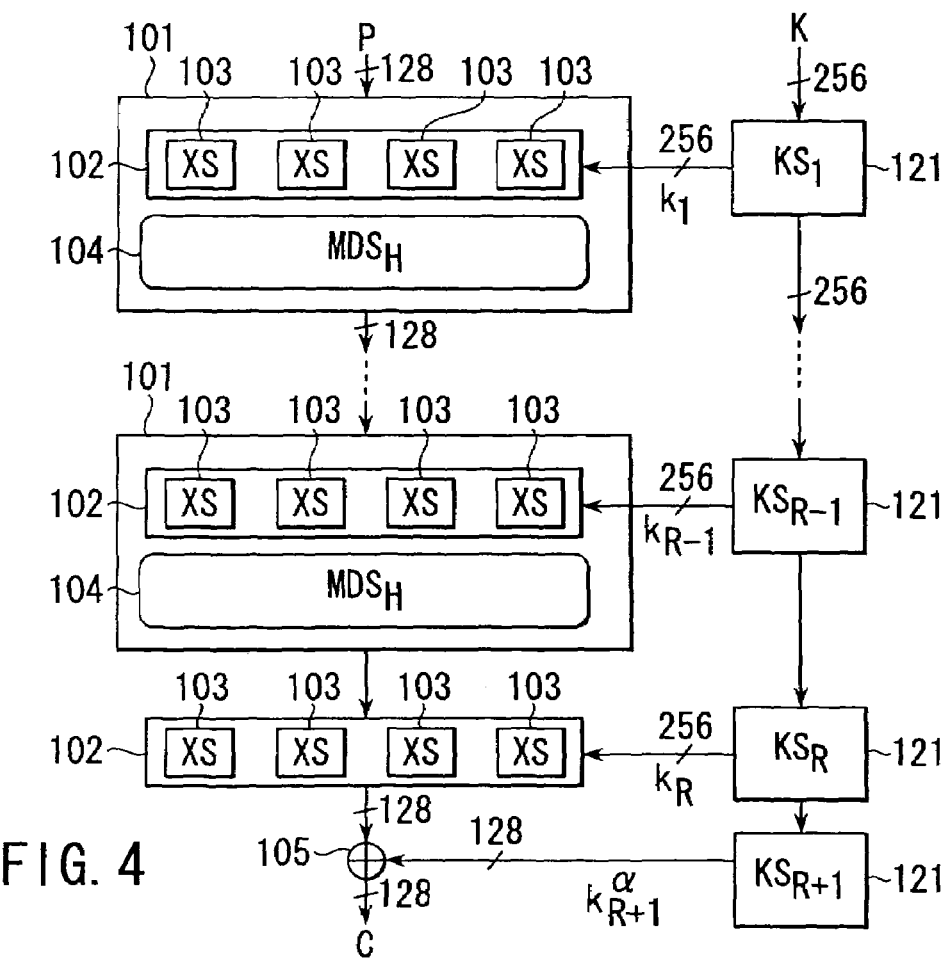
FIG. 4 is a block diagram showing an example of the arrangement of an encryption apparatus.

FIG. 4 shows an example of the arrangement of an encryption apparatus according to this embodiment.

Reference numeral 101 denotes a processing unit (stage function) of each stage; 104, a higher-level MDS diffusion layer; 102, an extended S-box layer; and 103, individual extended S-boxes. Reference numeral 105 denotes an EX-OR unit. Reference numeral 121 denotes one stage of a key scheduling part (details will be described later). Reference symbol P denotes 128-bit plaintext as an input; and C, 128-bit ciphertext as an output.

The stage function 101 has a structure in which four parallel 32-bit processing subblocks (extended S-boxes) 103 each consisting of a two-stage SPN structure are juxtaposed, and their outputs are coupled by the MDS diffusion layer 104. The overall basic structure is defined by repetitions of this stage function 101.

In the example of FIG. 4, to attain symmetric encryption and decryption processes, the final stage is constructed by only an extended S-box layer 102 and a key adder 105.

Since two stages of SPN structures are embedded in one stage of the stage function 101, and key addition is made at the end of the process, the bit length of an extended key is 2×128×R+128=128(2R+1). When R=8, the bit length is 128×17 bits.

An S-box will be explained below.

Encryption of this example uses an 8-bit S-box defined by an input/output table.

FIG. 5 shows an example of the input/output table of the 8-bit S-box. In FIG. 5, sequence elements are expressed by hexadecimal notation.

In the table of FIG. 5, the uppermost left value "72" corresponds to s[0]; its right neighboring value "AA" to s[1]; the right end value "9F" of that line to s[15]; the left end value "69" of the next line to s[16]; its right neighboring value "6A" to s[17]; and so forth. The lowermost right value "57" corresponds to s[255].

The characteristics of the S-box exemplified in FIG. 5 are as follows.

maximum differential probability: 6/256 (theoretical minimum value=4/256)

maximum linear probability: 22/256 (theoretical minimum value=16/256)

algebraic order: 7-th order (maximum value of bijection function)

Note that the S-box may use an arithmetic process in place of the input/output table.

Each extended S-box (also called a lower-level structure) will be explained below.

FIG. 6 shows an example of the internal arrangement of the extended S-box 103. In this example, two sets of four parallel 8-bit S-boxes 112 (see FIG. 5) form a two-stage SPN structure to sandwich a diffusion layer 113 therebetween. This structure should be called an SPS structure, but is regarded as a special two-stage SPN structure from which the diffusion layer of the second stage is omitted. A key adder 111 is provided immediately preceding to each S-box 112. The diffusion layer 113 in the extended S-box uses an MDS matrix, which is called a lower-level MDS, and is expressed by $MDS_L$.

Figure 7:
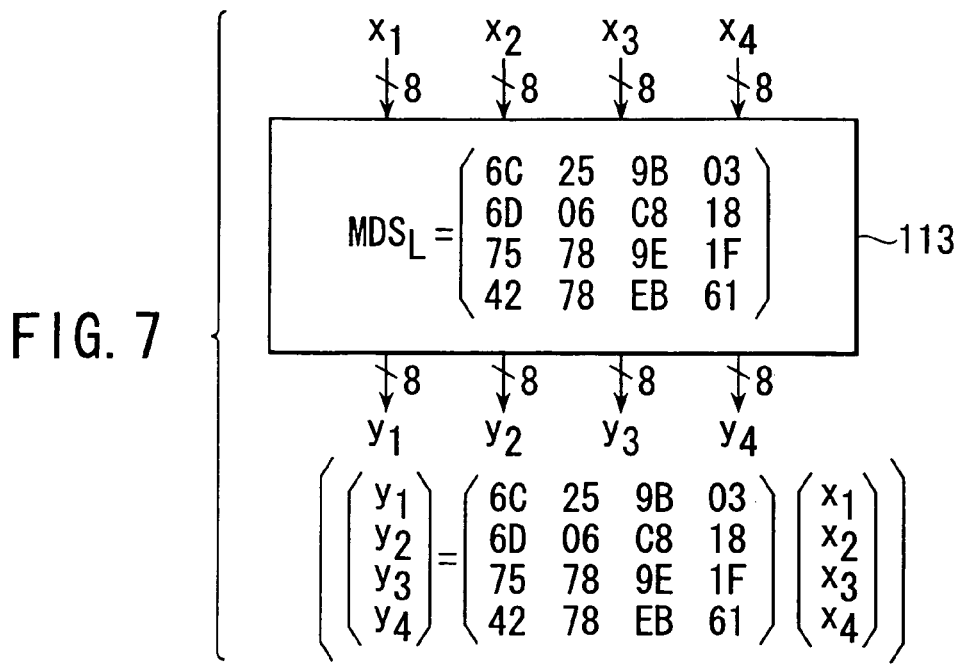
FIG. 7 shows an example of a lower-level MDS.

FIG. 7 shows an example of the $MDS_L$ matrix used in encryption of this embodiment. In FIG. 7, matrix elements are expressed in hexadecimal notation. Note that S-box inputs and outputs, and matrix elements are considered as elements of Galois field $GF(2^8)$ upon multiplication. A primitive polynomial in case of this example is $x^8 + x^6 + x^5 + x + 1$.

A higher-level structure as a stage function of encryption of this example will be described below.

Figure 8:
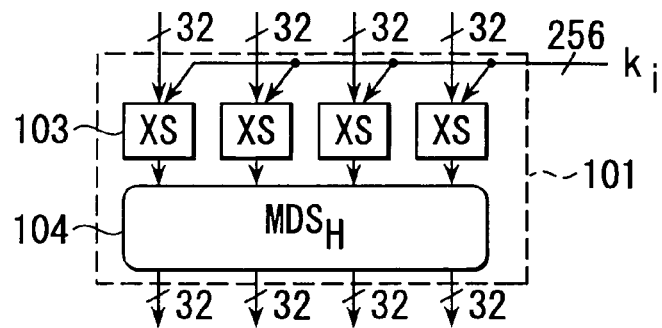
FIG. 8 shows an example of the structure of one stage of the data randomizing part.

FIG. 8 shows an example of the arrangement of one-stage portion 101 of the randomizing part. The higher-level structure 101 as a stage function of encryption of this example is constructed by coupling four parallel 32-bit extended S-boxes 103 (see FIG. 6) by a diffusion layer 104 of an MDS matrix. The diffusion layer 104 in the higher-level structure 101 as a stage function uses an MDS matrix, which is called a higher-level MDS and is expressed by $MDS_H$. Note that the MDS matrix in this case means that the branch number in consideration of the extended S-box is 5.

The simplest implementation of a higher-level MDS is to use the 32-bit wide output of an extended S-box as elements of GF($2^{32}$). Although this technique readily warrants high strength, it is generally difficult to implement or to attain high-speed processing. In this case, preferably some constraints are applied to the higher-level MDS matrix.

The four parallel MDS matrices can be sufficiently configured by the 4-bit width, and can be implemented using arithmetic operations over GF($2^4$). A cyclic MDS allows efficient calculations.

In practice, intermediate configurations using GF($2^8$) and GF($2^{16}$) are available.

A higher-level MDS using GF($2^{32}$) will be described below.

In this case, the inputs and outputs of an extended S-box are considered as elements of GF($2^{32}$) to design a higher-level MDS. This is a natural design method in the SPN structure. However, it is not practical with the 32-bit width to implement using a multiplication table. Also, implementation by means of calculations cannot achieve high-speed processing since a normal MDS matrix requires a large calculation volume. The calculation volume increases since the process upon carry-up in multiplication over the Galois field is heavy. To suppress the calculation volume, a method of configuring a higher-level MDS matrix using elements in which "1"s appear in only lower 5 bits of 32 bits (bits other than the lower 5 bits are fixed to zero) in bit expression is available. Using a matrix that satisfies such condition, the shift-up process can be processed by table lookup using upper 4 bits as an input.

Figure 9:
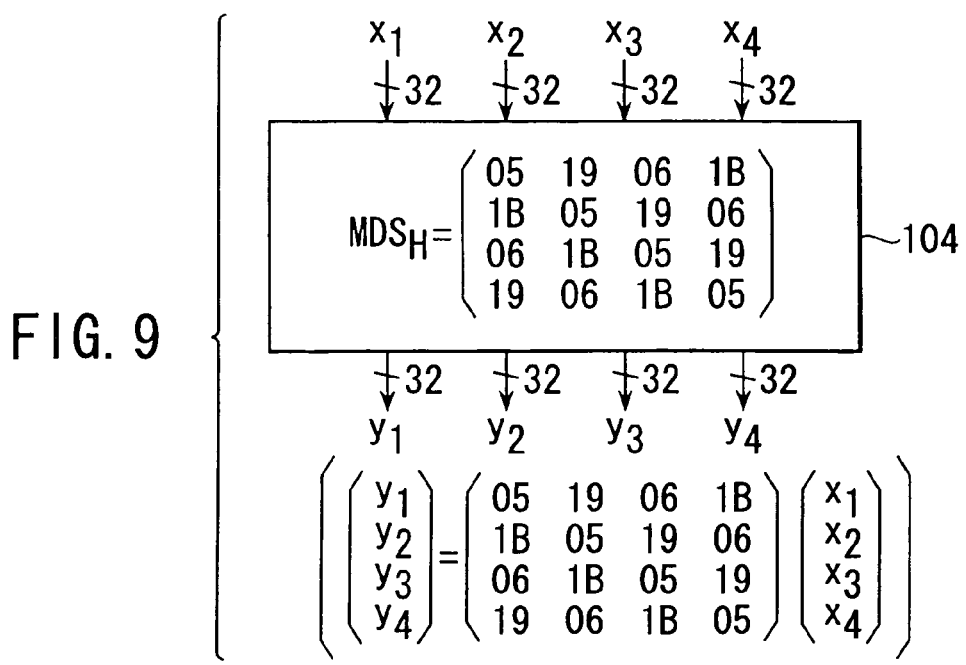
FIG. 9 shows an example of a higher-level MDS.

FIG. 9 shows an example of the higher-level MDS matrix. A primitive polynomial in case of this example is $x^{32}+x^{28}+x^{27}+x+1$.

A higher-level MDS using GF($2^4$) will be explained.

Figure 10:
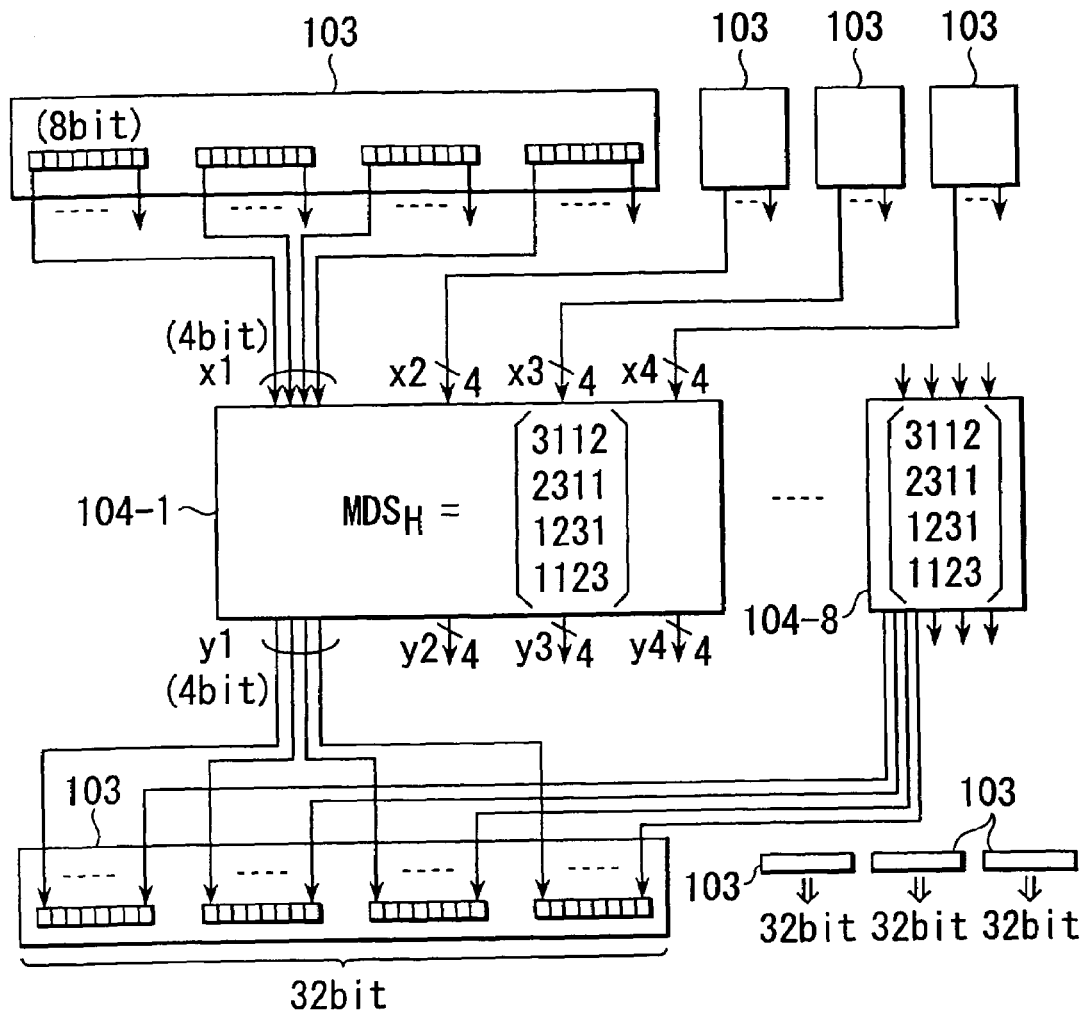
FIG. 10 shows another example of the higher-level MDS.

FIG. 10 shows an example of the MDS matrix in this case. A primitive polynomial in case of this example is $x^4+x+1$.

In this case, 1-bit data at corresponding positions (the most significant bits are exemplified in FIG. 10) of the outputs, i.e., 8-bit data of four S-boxes in one extended S-box 103 form 4-bit data per set, and four sets of 4-bit data from one extended S-box 103 are considered as elements of GF($2^4$).

A diffusion layer 104 between two stages of four parallel extended S-box layers 103 uses 4 (rows)×4 (columns) MDS matrices (e.g., 104-1 in case of the most significant bits in FIG. 10) at corresponding positions of 8-bit data.

The four sets of 4-bit data as outputs are connected to corresponding positions of corresponding source 8-bit data.

Eight MDS matrices (104-1 to 104-8) are prepared as higher-level MDS matrices in correspondence with the bit width of S-boxes.

These 4 (rows)×4 (columns) MDS matrices guarantee the branch number=5. Since the individual MDS matrices are connected to different bit positions in S-boxes, the branch number=5 is guaranteed as a whole.

By table lookup in units of S-box outputs at corresponding positions of extended S-boxes (also by arithmetic operations), efficient implementation that simultaneously processes eight MDS matrices can be made.

If cyclic MDS matrices are used, an efficient process that combines EX-ORing in units of 32 bits and bit rotations in units of 8 bits can be performed.

Based on the same idea as described above, processing may be performed in units of 2 bits at corresponding positions of 8-bit data, and four 4 (rows)×4 (columns) MDS matrices (GF($2^8$)) having 8-bit elements may be prepared as higher-level MDS matrices. On the other hand, processing may be performed in units of 4 bits at corresponding positions of 8-bit data, and two 4 (rows)×4 (columns) MDS matrices (GF($2^{16}$)) having 16-bit elements may be prepared as higher-level MDS matrices.

In the above description, bits at corresponding positions are extracted and processed. Alternatively, bits at different positions may be (exclusively) extracted and processed. In FIG. 10, four parallel extended S-boxes 103 are used, but the number of parallel extended S-boxes is not limited to such specific value. Also, all the extended S-boxes need not have the same internal arrangement, and some of them may have different arrangements. All the higher-level MDS matrices need not have the same internal arrangement, and some of them may have different arrangements. The same applies to lower-level MDS matrices and the input/output tables of S-boxes. For example, the first input stage and last output stage may have internal arrangements different from those of the intermediate stages. In addition, various other variations are available.

The key scheduling part (key generator) will be explained below.

Figure 11:
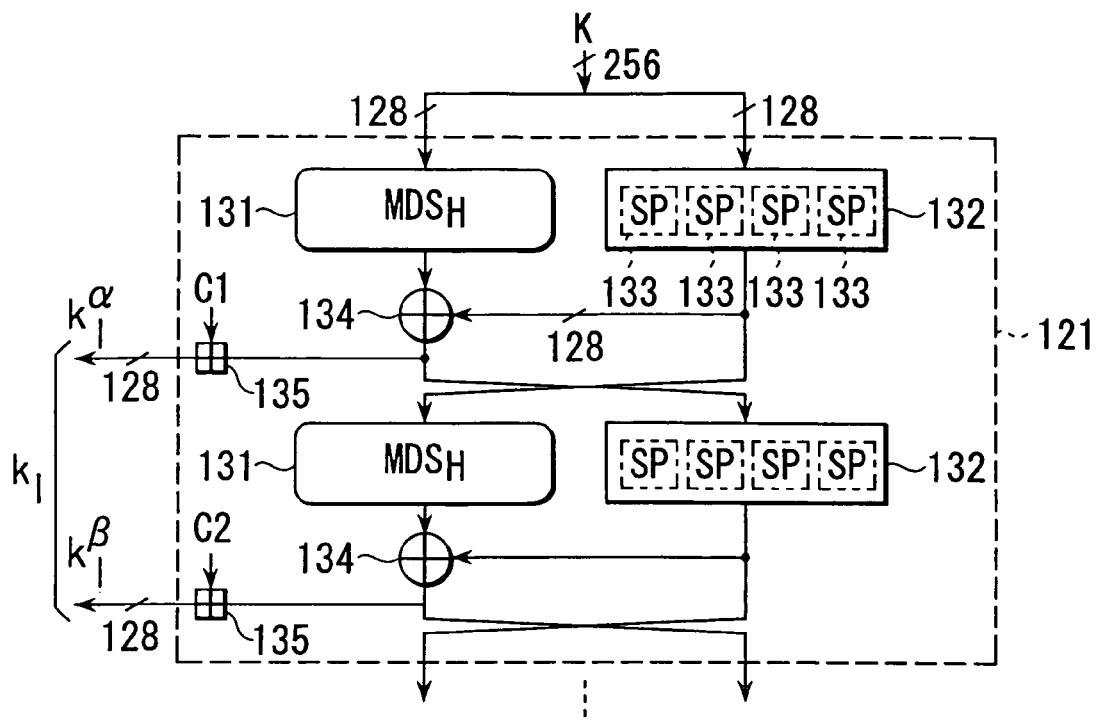
FIG. 11 is a block diagram showing an example of the arrangement of a key scheduling part.

FIG. 11 shows an example of the arrangement of the key scheduling part. Reference numeral 121 denotes a portion corresponding to one stage of the stage function of the data diffusion part; 131, a linear diffusion layer (in this example, a diffusion layer using a higher-level MDS matrix); 132, a nonlinear transformation layer (in this example, four parallel SP layers (S-box layers/diffusion layers) 133); 134, an EX-OR unit; and 135, a remainder adder. Although not shown in FIG. 11, the arrangement of the portion 121 is repeated in correspondence with the number of stages. When the arrangement unit that outputs a 128-bit key is defined as one stage of the key scheduling part, the number of key scheduling part is (2R+1)(=17 when R=8).

In the example shown in FIG. 11, 128 bits as the left half of the output of each stage of a 256-bit modified Feistel repetitive process are extracted, and a stage number dependent constant $C_i$ is added thereto as a remainder to obtain an extended key.

When the key length is 256 bits, for example, the upper 128 bits are input to the linear diffusion layer 131 of the first stage, and the lower 128 bits are input to the nonlinear transformation layer 132. When the key length is 128 bits, for example, the 128 bits are input to the linear diffusion layer 131 of the first stage, and also to the nonlinear transformation layer 132. When the key length is 192 bits (=64 bits×3), for example, 128 bits obtained by coupling the upper 64 bits and the intermediate 64 bits are input to the linear diffusion layer 131 of the first stage, and 128 bits obtained by coupling the upper 64 bits and the lower 64 bits are input to the nonlinear transformation layer 132.

Figure 12:
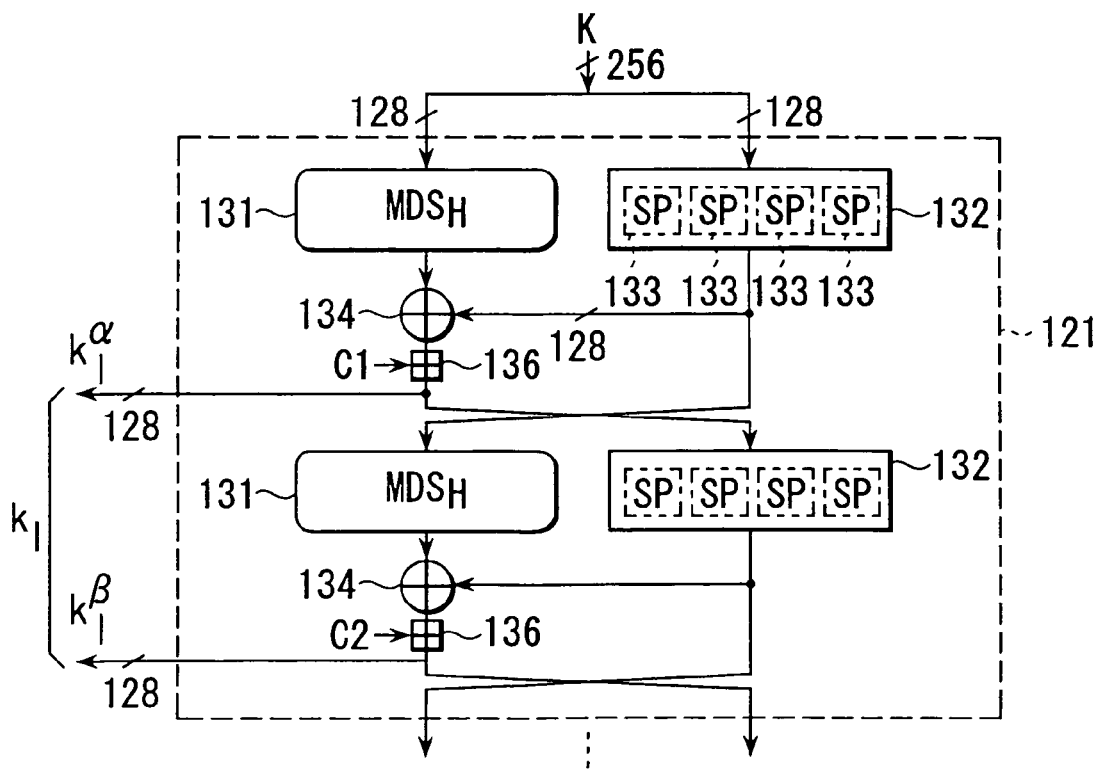
FIG. 12 is a block diagram showing another example of the arrangement of the key scheduling part.

Note that the location of the remainder adder 136 that adds the stage number dependent constant $C_i$ as a remainder may have various variations, as shown in FIG. 12.

Figures 13, 14, 15:
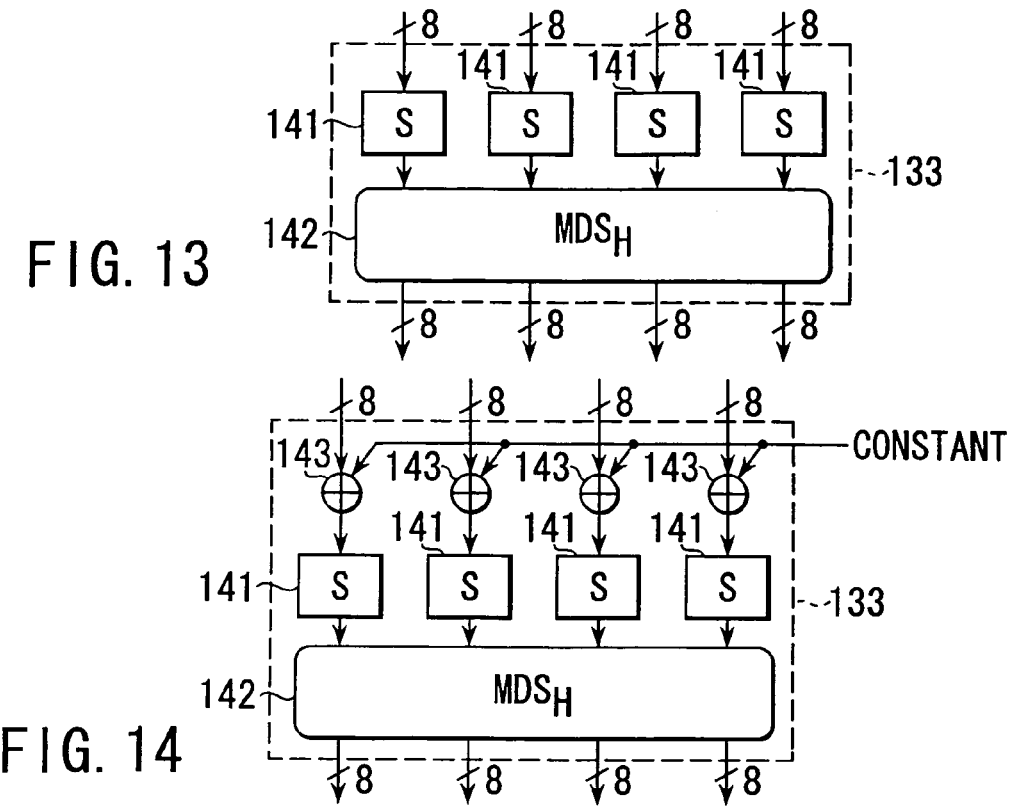
FIG. 13 is a block diagram showing an example of the internal arrangement of a nonlinear transformation layer.
FIG. 14 is a block diagram showing another example of the internal arrangement of the nonlinear transformation layer.
FIG. 15 shows an example of an additive constant table.

FIG. 13 shows an example of the arrangement of each SP layer 133 of the nonlinear transformation layer 132 in FIGS. 11 and 12. Reference numeral 141 denotes S-boxes; and 142, a lower-level MDS for receiving the outputs from the four parallel S-boxes.

Note that this S-box may be either the same as or different from that (FIG. 5) for the encryption processing shown in FIG. 4. The same applies to the lower-level MDS. The S-boxes and lower-level MDS may have different arrangements in units of stages of the key scheduling part.

FIG. 14 shows another example of the arrangement of each SP layer 133 of the nonlinear transformation layer 132 in FIGS. 11 and 12. In this example, EX-OR units 143 are added to the arrangement shown in FIG. 13.

Furthermore, a constant to be EX-ORed with the input to each S-box may be a stage number dependent constant in FIG. 14.

An example of a method of generating different constants $C_i$ in individual stages will be explained below.

The 128-bit additive constant $C_i$ of the key scheduling part in FIGS. 11 and 12 are described by a combination of four bit constants ($H_0$, $H_1$, $H_2$, $H_3$). Examples of 32-bit constants $H_i$ are:

$H_0 = (5A827999)_H = \lfloor(\sqrt{2}/4 \times 2^{32})\rfloor$
$H_1 = (6ED9EBA1)_H = \lfloor(\sqrt{3}/4 \times 2^{32})\rfloor$
$H_2 = (8F1BBCDC)_H = \lfloor(\sqrt{5}/4 \times 2_{32})\rfloor$
$H_3 = (CA62C1D6)_H = \lfloor(\sqrt{10}/4 \times 2^{32})\rfloor$ where $\lfloor x \rfloor$ is a floor function and indicates an largest integer which is not larger than x.

A combination of additive constants $C_i$ is described by $C_i = (C_{i0}, C_{i1}, C_{i2}, C_{i3})$. In order to allow easy generation of different 128-bit constants $C_i$ in individual stages, 8-bit LFSRs are used to determine a combination of $H_i$ which form $C_i$. For example, $(1D)_H$ is used in the primitive polynomial of each LFSR, and $(8B)_H$ is used in the initial state of each LFSR. A bit sequence generated using the LFSRs is read out in units of 2 bits to determine a 32-bit constant $H_i$ used as the constant.

FIG. 15 shows an example of an additive constant table determined using the LFSRs by the aforementioned method.

Note that the initial state of each LFSR may be variable or fixed. In the former case, the initial state of each LFSR partially defines the key. In the latter case, only a decryption apparatus having the same initial state of each LFSR as that in the encryption apparatus can decrypt the ciphertext.

According to the aforementioned key scheduling part, in each SP layer 133, when 1 bit of the input has changed, the S-boxes 141 can spread that change to 8 bits, and the lower-level MDS 142 can spread the change to 32 bits. Furthermore, in the linear diffusion layer, since the higher-level MDS 131 largely diffuses the output from the nonlinear transformation layer of the previous state, a 1-bit difference are propagated to the 128-bit width.

Therefore, according to the key scheduling part, the respective stages easily generates, i.e., diffuse random keys. Since different constants are used in units of stages, keys rarely match among stages (keys hardly match).

Note that the key scheduling part may have another arrangement.

An efficient linear diffusion device used in the diffusion part of block encryption scheme data having a large block length will be explained below.

Figure 16:
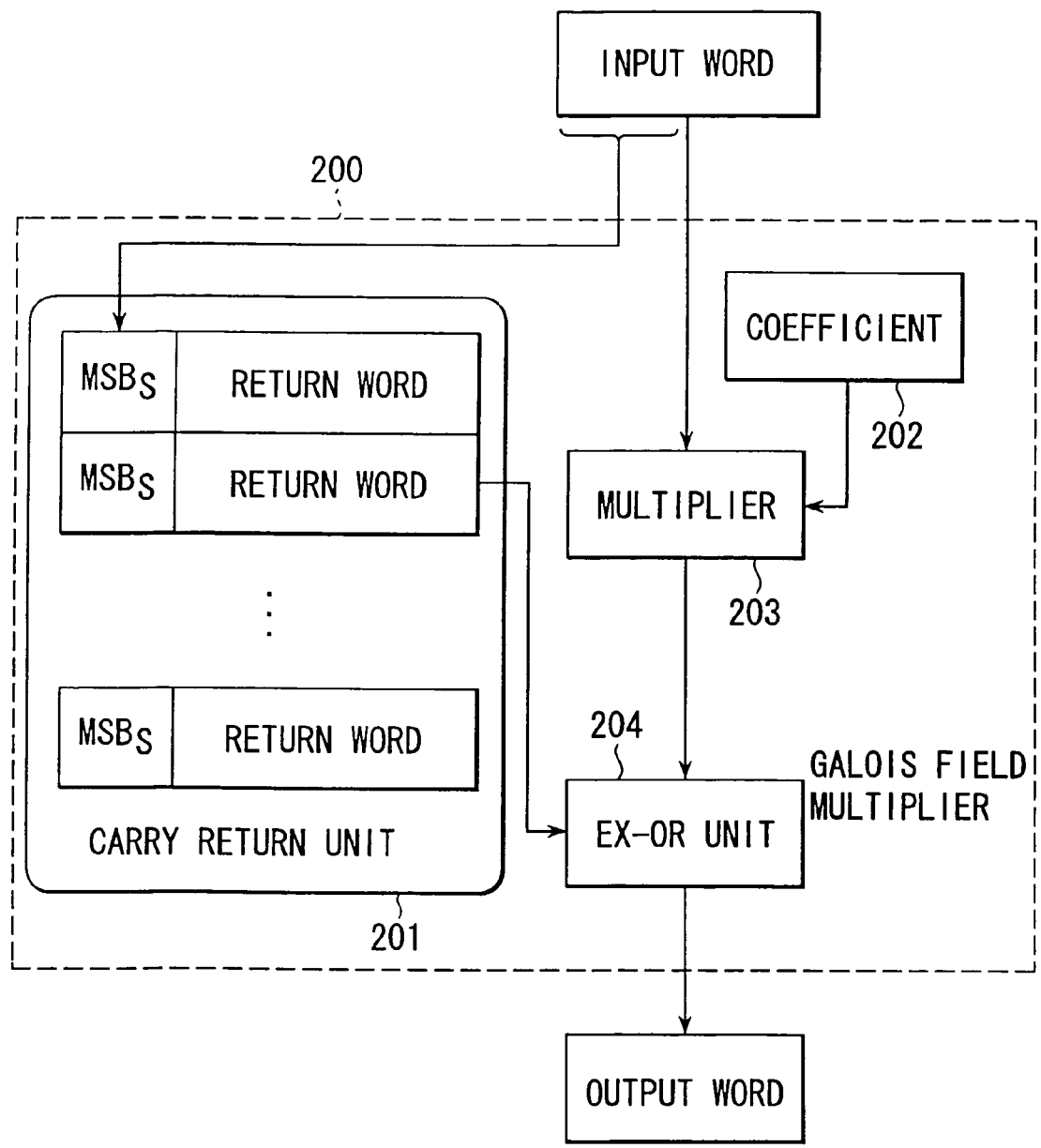
FIG. 16 is a block diagram showing an example of the arrangement of a Galois field multiplier.

FIG. 16 shows an example of the arrangement of a Galois field multiplier as a basic component of the linear diffusion device of this embodiment. This linear diffusion device are used to calculate the product of one input and one element of the higher-level MDS matrix in the aforementioned higher-level MDS (see 104 in FIGS. 9 and 4, 131 in FIGS. 11 and 12) using $GF(2^{32})$ or $GF(2^{16})$.

As shown in FIG. 16, the Galois field multiplier comprises a coefficient storage unit 202, multiplier 203, carry return unit 201, and EX-OR unit 204.

The coefficient storage unit 202 stores a coefficient, i.e., a multiplier of multiplication (for example, one element of the higher-level MDS matrix in FIG. 9).

The multiplier 203 multiplies the input word and coefficient when they are binary values.

When the coefficient of the coefficient storage unit 202 is a power of 2 like 1, 2, 4, . . . , a calculation using a normal multiplier are made. On the other hand, if the multiplier is a specific one that does not propagate any carry, a calculation are made when the coefficient of the coefficient storage unit 202 is an arbitrary value.

The carry return unit 201 searches for a value (return word) to be added by the EX-OR unit 204 to feed back a carry as a result of multiplication to multiplication over the Galois field.

The EX-OR unit 204 exclusively ORs the output from the multiplier 203 and the output bits of the carry return unit 201.

The function of the Galois field multiplier 200 is to calculate a product a×b of input word "a" as an element of an extension field $GF(2^k)$ of a Galois field GF(2), and a coefficient "b" as another element of that Galois field as an output word.

The product in the Galois field will be described below.

In the following description, i and j upon calculating sum totals in $\Sigma\, a_i x^i$ and $\Sigma\, b_j x^j$ range from 0 to k−1, and a description of these ranges will be omitted.

Elements of $GF(2^k)$ are expressed as a (k−1)-th order polynomial $\Sigma\, a_i x^i$ in a given variable x by polynomial expression. Element "a" is often expressed by arranging its coefficients like $c_{k-1}, c_{k-2}, \ldots, c_0$.

The product of two elements "a"=$\Sigma\, a_i x_i$ and b=$\Sigma\, b_i x_i$ is defined by:

a×b=($\Sigma\, a_i x^i$ a)×($\Sigma\, b_i x_i$) mod p(x)

where p(x) is called a primitive polynomial-of-$GF(2^k)$, and is a k-th order irreducible monic polynomial. Also, "mod" means that, for example, when k=32 and $p(x)=x^{32}+x^{28}+x^{27}+x+1$ is selected as a primitive polynomial, if the term of $x^{32}$ or factor appears as a product of the polynomial, it is considered as $(x^{28}+x^{27}+x+1)$. Therefore, the product is also a polynomial of order k or less.

In general, upon executing such operation, a multiplier using a multiplication table that searches for a product using a multiplier and multiplicand as tags is often used so as to attain high-speed processing. However, since both the multiplier and multiplicand can assume $2^k$ values, the multiplication table has $2^{2k}$ entries, each having a k-bit size. For this reason, when k becomes large to some extent, the multiplication table has a very large size.

This embodiment is basically similar to that method using the multiplication table, but when coefficients satisfy a given constraint condition, such table are implemented by much smaller storage size.

In this constraint condition, coefficient b is a constant, and only lower order coefficients of given order t or less have nonzero coefficients (coefficients exceeding the t-th order are 0, and coefficients of the t-th order or less are 0 or 1). When given element "a" assumes an arbitrary element, a maximum of a 32-bit carry is generated, but when this constraint condition is satisfied, a t-bit carry at most is generated. The t-bit carry value is determined by the MSB (Most Significant Bits) within the upper t-bit range of multiplier "a".

The difference between multiplication over the Galois field and that considered as a normal polynomial is that when a carry to a coefficient of the 32nd-order or higher is generated as a product of binary values, contribution of that carry must be returned to coefficients of less than the 32nd-order by the primitive polynomial, but the carry return unit 201 has words to be returned in the form of a table in this embodiment.

This return word are determined by coefficient b of (t+1) bits at most, upper t bits of multiplicand "a", and a primitive polynomial. That is, the return word is given by (a[(k−t) . . . (k−1)]×b)[(t+1) . . . 2t] mod p(x) where a[(k−t) . . . (k−1)] extracts terms from the (k−1)-th order to the (k−t)-th order from "a".

That is, the contents of the return word table of the carry return unit 201 are determined in correspondence with elements of the corresponding MDS matrix (see FIG. 9).

The return word table of the carry return unit 201 has $2^t$ entries, each having a k-bit size.

The linear transformation section which is implemented using the aforementioned Galois field multiplier and calculates the linear transforms of data blocks of block encryption scheme will be described below.

Linear transformation using an MDS matrix is known as a kind of linear transformation. The MDS matrix is an n (rows)×n (columns) matrix in which a data block consists of a plurality of (n) words, and when each word has a k-bit length, it is considered as an element of a Galois field $GF(2^k)$, and which linearly maps a set of n elements to a set of n elements, and has all nonzero small matrices. Linear transformation based on the MDS matrix can guarantee the lower limit of the number of nonzero input/output words.

However, in general, a matrix operation over the Galois field $GF(2^k)$ includes several times of multiplication and addition over the $GF(2^k)$, resulting in high calculation cost.

Figure 17:
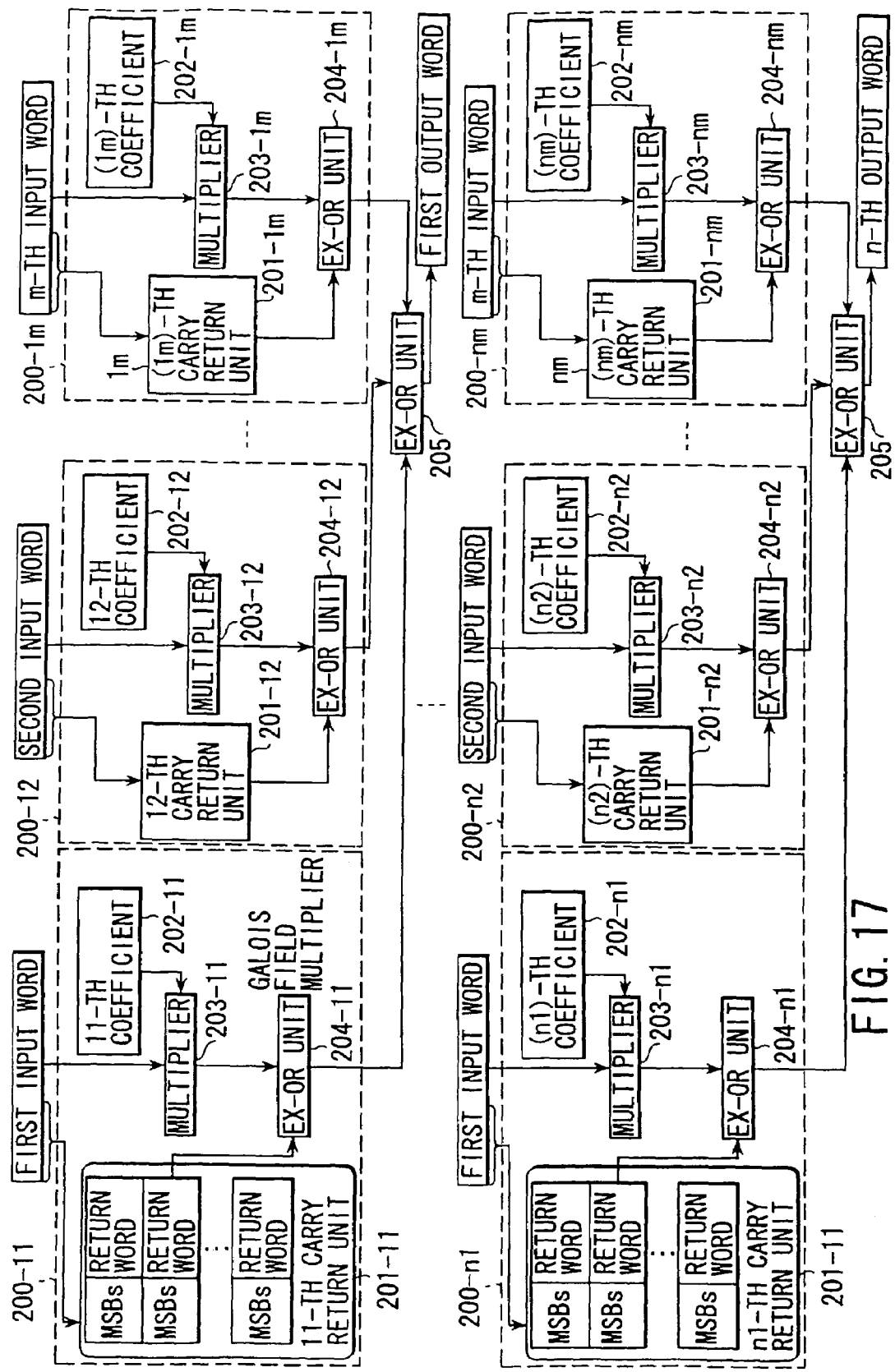
FIG. 17 is a block diagram showing an example of the arrangement of a linear transformation section.

FIG. 17 shows an example of the arrangement of the linear transformation section of this embodiment. This linear transformation section are used in the aforementioned higher-level MDS (104 in FIGS. 9 and 4, 131 in FIGS. 11 and 12) using $GF(2^{32})$ or $GF(2^{16})$.

In the arrangement shown in FIG. 17, the Galois field multipliers shown in FIG. 16 are prepared in a matrix pattern in correspondence with the MDS matrix.

If m=n in —FIG. 17, a coefficient of each of $n^2$ Galois field multipliers 200 assumes the same value as the corresponding element of an n (rows)×n (columns) MDS matrix. A device having a coefficient $a_{ij}$ receives the i-th input word.

EX-OR units 205 corresponding to respective output words calculate EX-ORs of output bits of all the Galois field multipliers 200 having coefficients $a_{ij}$ corresponding to given j, and output them as the j-th output words.

Figure 18:
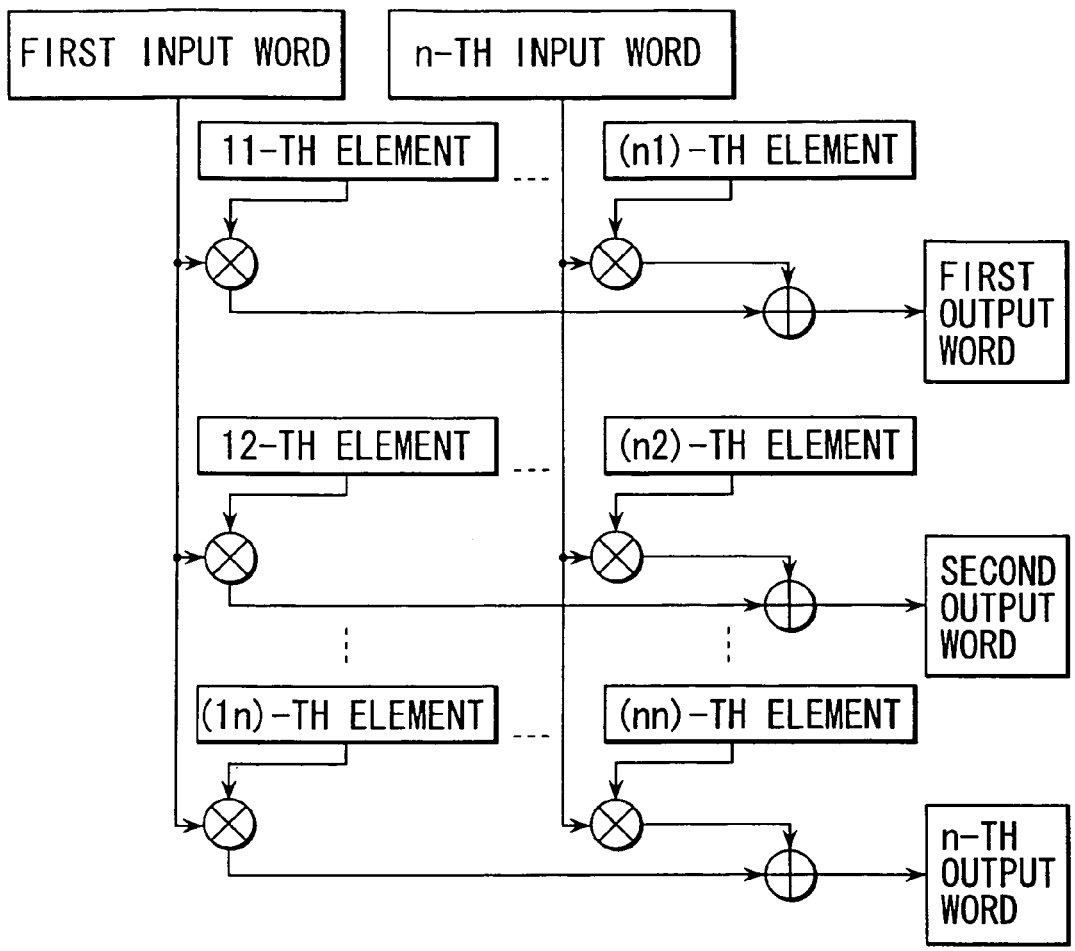
FIG. 18 is a block diagram showing another example of the arrangement of the linear transformation section.

FIG. 18 shows another example of the arrangement of the linear transformation section of this embodiment. According to the linear transformation section of this example, when an MDS matrix that expresses linear transformation is expressed by ($a_{ij}$), only terms of the t-th order or less of each element $a_{ij}$ have nonzero coefficients. Assume that i and j can assume an integer ranging from 0 to n−1. Also, t is a positive value smaller than the extension order k of the Galois field $GF(2^k)$.

In this way, multiplication shown in FIG. 18 are implemented.

Note that the contents of the return word table of the carry return unit 201 are determined in accordance with the corresponding elements of the MDS matrix. Therefore, in the example of the higher-level MDS matrix shown in FIG. 9, only four different return word tables are prepared.

An MDS matrix generation section (or random generation algorithm) for generating an MDS matrix (especially, higher-level MDS) used in the encryption system of the present invention will be explained below.

Figure 19:
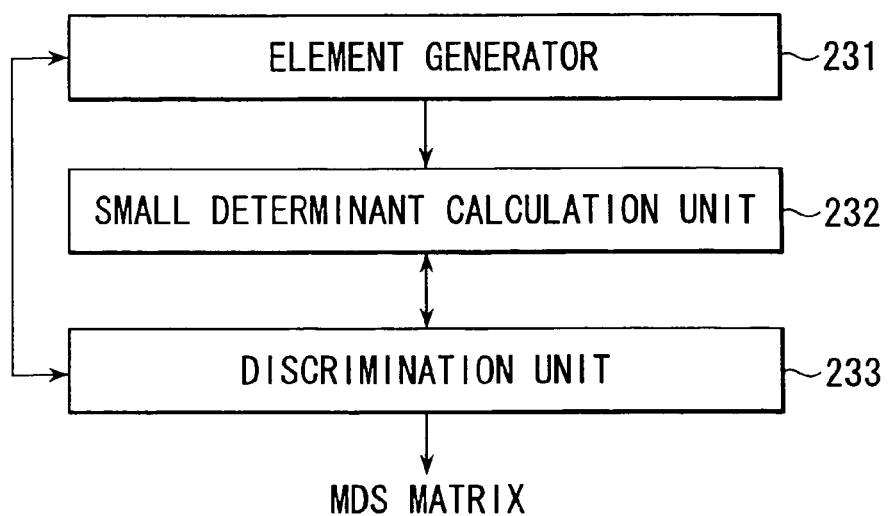
FIG. 19 is a block diagram showing an example of the arrangement of an MDS matrix generation section.

FIG. 19 shows an example of the arrangement of the MDS matrix generation section. As shown in FIG. 19, the MDS matrix generation section comprises an element generator 231, small determinant calculation unit 232, and discrimination unit 233.

Figure 20:
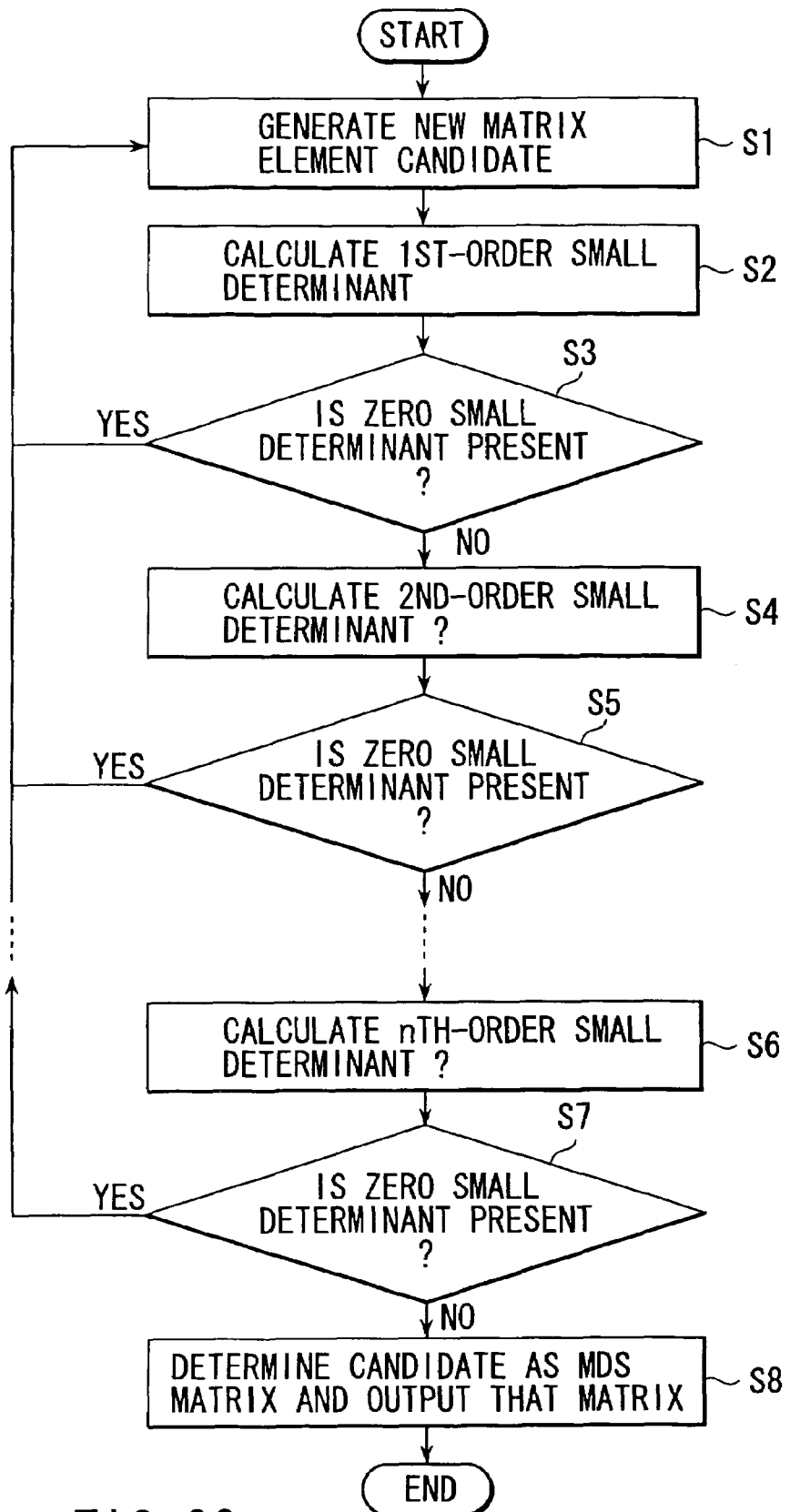
FIG. 20 is a flow chart showing an example of an MDS matrix generation processing sequence.

FIG. 20 shows an example of the sequence in this case.

The element generator 231 randomly generates matrix elements of an n (rows)×n (columns) MDS matrix (step S1). When the aforementioned Galois field multiplier is allowed to be applied, an MDS matrix in which only lower t bits consist of nonzero elements (elements of the t-th order or less) (that is, in this case, the element generator 231 checks if only lower t bits are nonzero) is generated.

In order to generate matrix elements, various methods such as a method of generating and using random numbers, a method of using control variable values of multiple loops, and the like are available.

The small determinant calculation unit 232 calculates 1st-order small determinants of the matrix generated by the element generator 231 (step S2), and the discrimination unit 233 checks if the small determinant calculated by the small determinant calculation unit 232 is nonzero (step S3). If at least one zero 1st-order small determinant is found, the processing is performed again from step S1.

If all 1st-order small determinants are nonzero, 2nd-order small determinants are similarly checked (steps S4 and S5).

The aforementioned process is repeated up to nth-order small determinants (steps S6 and S7), and if it is confirmed that all small determinants from the 1st order to the nth-order are nonzero, that MDS matrix is output (step S8).

When the MDS matrix obtained in step S8 is used in encryption, an MDS matrix used in decryption is given by an inverse matrix of the MDS matrix obtained in step S8 (conversely, when the MDS matrix obtained in step S8 is used in decryption, its inverse matrix is used as an MDS matrix used in encryption).

Note that even if all elements of the MDS matrix obtained in step S8 have only nonzero lower t bits, all elements of its inverse matrix do not always have only nonzero lower t bits.

In the sequence shown in FIG. 20, small determinants are checked in turn from the 1st order to the nth order, but may be checked in other orders, or all or some of these determinants may be parallelly checked.

A method of obtaining MDS matrices so that both the MDS matrix used in encryption and that used in decryption as the inverse matrix of the former matrix satisfy a condition that only lower t bits are nonzero will be explained below.

Figure 21:
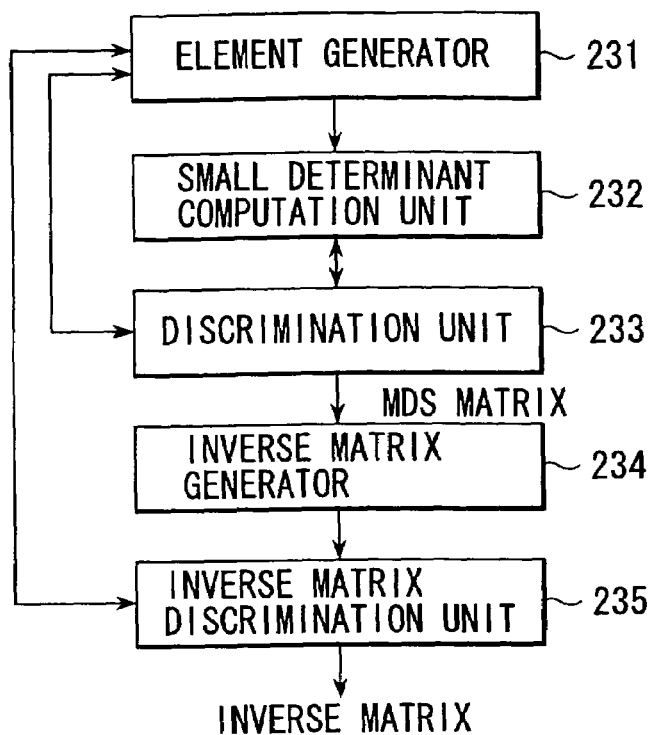
FIG. 21 is a block diagram showing another example of the arrangement of the MDS matrix generation section.

FIG. 21 shows an example of the arrangement of the MDS matrix generation section in this case. As shown in FIG. 21, the MDS matrix generation section comprises the element generator 231, the small determinant calculation unit 232, the discrimination unit 233, an inverse matrix generator 234, and an inverse matrix discrimination unit 235. The element generator 231, small determinant calculation unit 232, and discrimination unit 233 are the same as those in FIG. 19.

FIG. 22 shows an example of the sequence in this case.

As in the above example, the element generator 231, small determinant calculation unit 232, and discrimination unit 233 generate an MDS matrix consisting of elements only lower t bits of which are nonzero (step S11).

The inverse matrix generator 234 generates an inverse matrix of the generated MDS matrix (step S12).

The inverse matrix discrimination unit 235 checks if only lower t bits of each element of the obtained inverse matrix are nonzero.

If only lower t bits of all elements are nonzero (step S13), these MDS matrix and inverse matrix are output (step S14).

If at least one element is found to have nonzero lower t bits (step S13), the processing is performed again from step S11.

When the MDS matrix generated in step S11 is used in encryption, the inverse matrix generated in step S12 is used in decryption (conversely, when the MDS matrix generated in step S11 is used in decryption, the inverse matrix generated in step S12 is used in encryption).

Upon generating an MDS matrix, an MDS matrix in which elements having identical values are not present in identical rows (in an n (rows)×n (columns) MDS matrix, the (i1)-th to (in)-th elements do not include two or more elements having identical values) may be generated. For example, in the examples of the sequences shown in FIGS. 20 and 22, it is determined upon generating an MDS matrix if elements having identical values are present in a single row, and if elements having identical values are found in a single row, the MDS matrix may be generated. Note that elements having identical values may be present in a single row.

Using a linear transformation section that selects an MDS matrix in which elements having identical values are not present in a single row as a linear transformation section of block encryption scheme data, the probability that differential values of input words cancel each other are reduced.

On the other hand, an MDS matrix in which the sum of elements in a single row is not 1 or 0 may be generated. In this case, the same effect are obtained.

A method of improving security by selecting (or optimizing) the combination of S-box and lower-level MDS and, more particularly, a design method of a combination of S-box and lower-level MDS which can guarantee that the maximum differential characteristic probability becomes better than the theoretical worst example, will be described below.

Since MDS guarantees only the branch number B, if p represents the maximum differential probability of S-boxes, the maximum differential characteristic probability is $p^B$. For example, an m (rows)×m (columns) MDS has B=m+1. However, by selecting (optimizing) the combination of S-box and lower-level MDS, a maximum differential characteristic probability of less than $p^B$ are guaranteed by the branch number B. As a result, by combining an MDS with a smaller maximum differential probability than a normal MDS with S-boxes, a synergetic effect are expected, and security are further improved.

As security evaluation schemes of an encryption algorithm, differential cryptanalysis and linear cryptanalysis are known, and they have duality. Paying attention to differential cryptanalysis, the security of S-boxes is specified by the probability that the input and output have differential correlation, and is higher with decreasing probability. In the encryption algorithm, the security are improved as a larger number of S-boxes with a smaller differential probability are combined. As an efficient coupling method of S-boxes, a linear transformation section has been conventionally proposed. The linear transformation section calculates the linear transform of data having a given block length, and is used as a component of an encryption apparatus (and a decryption apparatus). Linear transformation using an MDS matrix is known as a kind of linear transformation.

An MDS matrix defines linear transformation to n words when a data block is made up of a plurality of (n) words, and guarantees (n+1) or more nonzero input/output words. However, since an S-box has a plurality of candidate values such as 6/256, 4/256, 2/256, and the like as a differential probability, an MDS in which each of (n+1) probabilities is 4/256 can assure higher security than an MDS in which each of (n+1) probabilities is 6/256.

Conventionally, the securities of the S-box and MDS are individually evaluated as sole building elements. In this embodiment, an example of a device for verifying the synergism of the S-box and MDS will be described.

Figure 23:
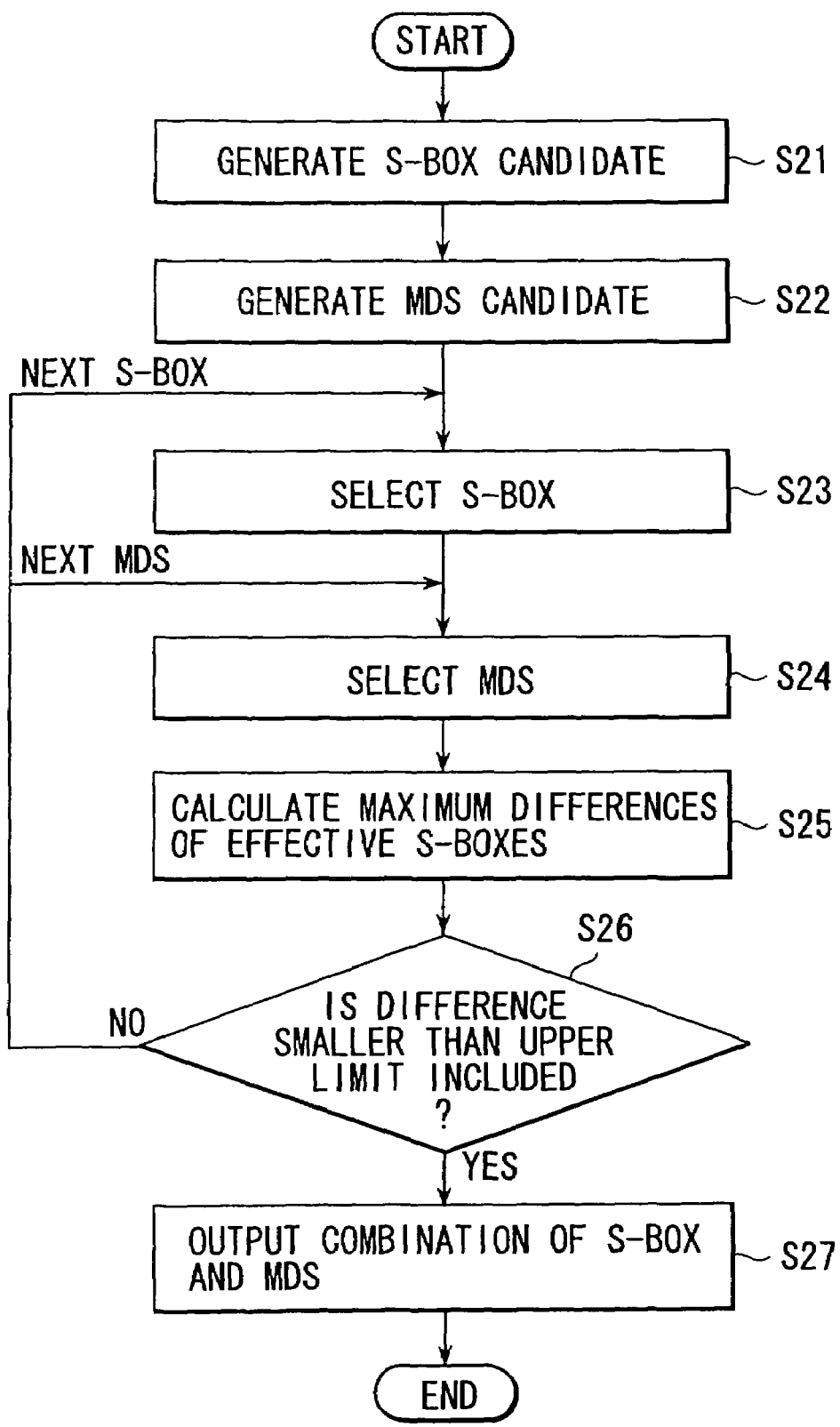
FIG. 23 is a flow chart showing an example of a processing sequence for selecting a combination of an S-box and lower-level MDS.

FIG. 23 shows an example of the processing sequence in this case. This example pays attention to differential cryptanalysis, and shows a process for determining an MDS that can expect synergism with the S-box. Since differential cryptanalysis and linear cryptanalysis have duality, the same effect are obtained for linear cryptanalysis when this process is performed in consideration of the linear probability.

A plurality of S-box candidates and a plurality of lower-level MDS candidates are generated (steps S21 and S22). Note that steps S21 and S22 may be executed in the reverse order, or may be executed parallelly.

One of the S-box candidates is selected (step S23), and one of the lower-level MDS candidates is selected (step S24). Note that steps S23 and S24 may be executed in the reverse order, or may be executed parallelly.

As will be described later, a maximum difference of effective (active) S-boxes is calculated (step S25), and it is determined if a difference (e.g., 4/256) smaller than an upper limit (e.g., 6/256) is included.

If such difference is included (step S26), a combination of the S-box and lower-level MDS at that time is output (step S27).

On the other hand, if no such difference is included (step S26), one or both of the S-box and lower-level MDS is or are reselected to repeat the aforementioned process.

In FIG. 23, a plurality of S-box candidates and a plurality of lower-level MDS candidates are generated initially. Alternatively, candidates other than the first set may be generated when the condition in step S26 is not satisfied and another S-box or MDS must be selected.

The actual processes in steps S25 and S26 are executed as follows.

In the example of the extended S-box 103 in FIG. 6, the following four different types of verifications (a total of 20 different verifications) are made for a combination of S-box and lower-level MDS, and when all conditions are satisfied, the set of S-boxes and lower-level MDS at that time are output in step S27.

(1) When one S-box 112 alone is activated on the input side of the lower-level MDS 113, if all four S-boxes 112 are activated on the output side of the lower-level MDS 113 and at least one of them has a difference smaller than the upper limit, it is determined that this verification is successful. This verification is made for each of the four S-boxes 112 on the input side (there are four different patterns).

(2) When only two S-boxes 112 are activated on the input side of the lower-level MDS 113, if all four S-boxes 112 are activated on the output side of the lower-level MDS 113, it is determined that this verification is successful, and if three S-boxes 112 are activated on the output side of the lower-level MDS 113, and at least one of them has a difference smaller than the upper limit, it is determined that this verification is successful. This verification is made for each of combinations of two S-boxes on the input side (there are six different patterns).

(3) When only two S-boxes 112 are activated on the output side of the lower-level MDS 113, if all four S-boxes 112 are activated on the input side of the lower-level MDS 113, it is determined that this verification is successful, and if three S-boxes 112 are activated on the input side of the lower-level MDS 113, and at least one of them has a difference smaller than the upper limit, it is determined that this verification is successful. This verification is made for each of combinations of two S-boxes on the output side (there are six different patterns).

(4) When one S-box 112 alone is activated on the output side of the lower-level MDS 113, if all four S-boxes 112 are activated on the input side of the lower-level MDS 113 and at least one of them has a difference smaller than the upper limit, it is determined that this verification is successful. This verification is made for each of the four S-boxes 112 on the output side (there are four different patterns).

The plurality of verification processes may be sequentially performed, or all or some of them may be parallelly performed. If one of the plurality of verification processes is not successful, all the subsequent verification processes may be canceled for that combination of S-box and lower-level MDS, and it may be determined that verification is not successful.

In the example of the sequence shown in FIG. 23, when the first combination of S-box and lower-level MDS which satisfies the conditions is obtained, the process is aborted. Alternatively, a plurality of combinations of S-boxes and lower-level MDS which satisfy the conditions may be obtained, and the best evaluated one of these combinations may be selected.

The encryption apparatus has been explained. An decryption apparatus will be explained below.

The decryption apparatus has a structure obtained by reversing that of the encryption apparatus (the same key is used).

FIG. 24 shows an example of the arrangement of a decryption apparatus corresponding to the encryption apparatus shown in FIG. 4.

FIG. 25 shows an example of the internal arrangement of the inverse transform of an extended S-box corresponding to FIG. 6.

Figure 26:
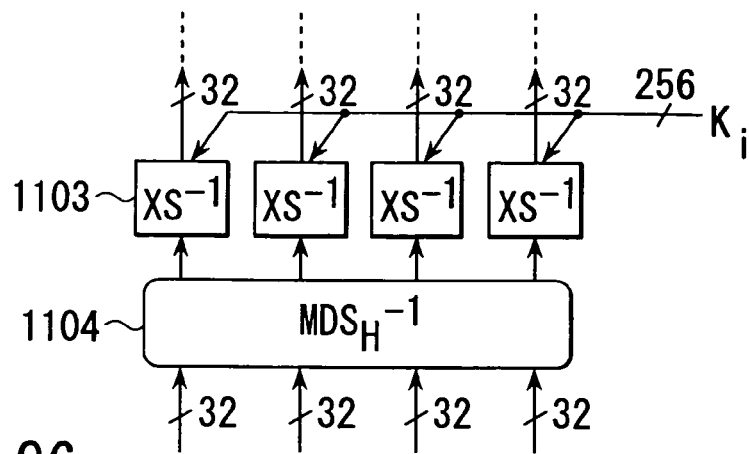
FIG. 26 shows an example of the structure of one stage of the inverse transform of a data randomizing part.

FIG. 26 shows an example of the structure of one stage of the inverse transform of a data randomizing part corresponding to FIG. 8.

In FIG. 24, a key scheduling part of the decryption apparatus has the same arrangement as that of the encryption apparatus shown in FIG. 4.

The input/output table of each S-box 1112, a lower-level MDS matrix of each lower-level MDS 1113, and a higher-level MDS matrix of a higher-level MDS 1104 have inverse functions (inverse matrices) of the input/output table of each S-box 112 (e.g., FIG. 5), the lower-level MDS matrix of each lower-level MDS 113 (e.g., FIG. 7), and the higher-level MDS matrix of the higher-level MDS 104 (e.g., FIGS. 9 and 10) in the encryption apparatus.

In FIG. 24, the key is generated in the same order as in FIG. 4, but may be generated in an order opposite to FIG. 4.

Figure 27:
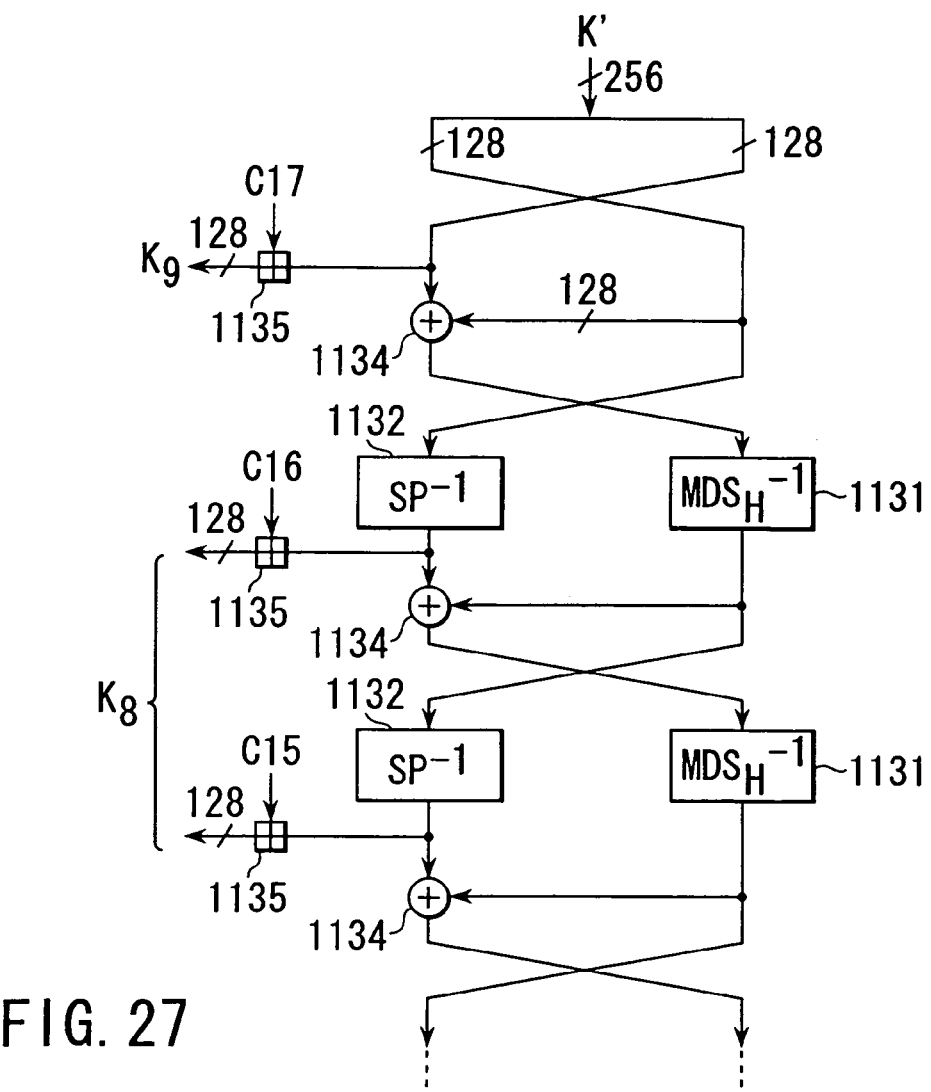
FIG. 27 is a block diagram showing an example of the arrangement of a key scheduling part.

FIG. 27 shows an example of the arrangement of the key scheduling part in such case.

Reference numeral 1132 denotes inverse transform of the nonlinear transformation layer 132 of FIG. 11 (including four parallel inverse transforms of the SP layers 133 (e.g., the inputs and outputs in FIG. 13 or 14 are reversed)).

The input/output table of each S-box, lower-level MDS matrix, higher-level MDS matrix used in the key scheduling part shown in FIG. 27 have inverse functions (inverse matrices) of those used in the key scheduling part in FIG. 11.

Assume that a decryption key input K' in FIG. 27 is the key used in the last key addition in FIG. 4 (for the encryption apparatus).

In this case as well, various variations of the locations where the stage number dependent constants $C_i$ are added as remainders are available in addition to the same method as in FIG. 12.

The example of 128-bit block encryption scheme equivalent to AES, which uses 8-bit S-boxes has been described as an application example of nested (recursive) SPN encryption as a combination of local diffusion (lower-level diffusion) and diffusion over the block width (higher-level diffusion). Another embodiment will be described using an example of 64-bit block encryption scheme equivalent to AES, which uses 8-bit S-boxes (portions which differ since 64 bits are used in place of 128 bits will be mainly explained).

An example of the arrangement of the second embodiment of a 64-bit block encryption scheme encryption apparatus/decryption apparatus or encryption algorithm/decryption algorithm to be described below corresponds to a case wherein two parallel nonlinear transformation modules 2 (extended S-boxes in the example) are used in the basic arrangement shown in FIG. 1.

As in 128-bit block encryption scheme mentioned above, 64-bit block encryption scheme can improve resiliency against attacks.

An example of the hierarchical structure of the data diffusion part of nested encryption is the same as that shown in FIG. 3.

The block length is 64 bits.

The key length is 128 bits as an example (of course, the present invention are practiced for other block lengths). A case wherein the key length=64 bits or 96 bits when the block length=64 bits will be described later.

As an example of the number of stages (a pair of a plurality of parallel extended S-boxes and a higher-level MDS (the final stage does not include any higher-level MDS, as will be described later) is counted as one stage), R=6 is used. Note that the number of stages is basically not particularly limited. However, the actual number of stages are appropriately set in consideration of security, computer resources, and the like, and it is more effective to set six or more stages.

In encryption of this embodiment, since a stage function includes two S-box layers, one stage corresponds to two stages in a normal structure. As for a higher-level MDS in the stage structure, some implementation examples based on Galois fields will be explained.

Figure 28:
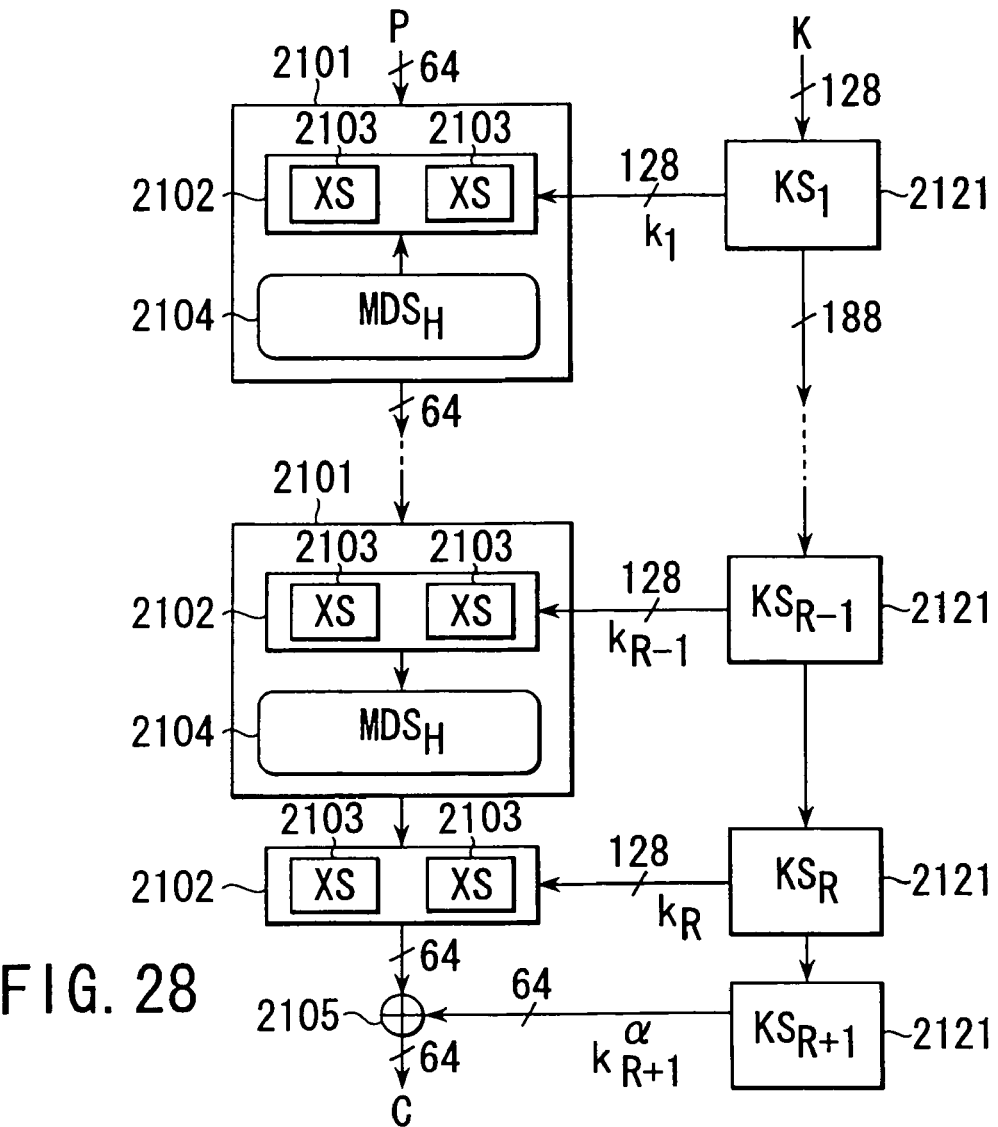
FIG. 28 is a view for explaining the basic configuration of encryption according to the second embodiment of the present invention.

FIG. 28 shows an example of the arrangement of an encryption apparatus according to this embodiment.

Reference numeral 2101 denotes each stage; 2104, a higher-level MDS diffusion layer; 2102, an extended S-box layer; and 2103, individual extended S-boxes. Reference numeral 2105 denotes an EX-OR unit. Reference numerals 2121 to 2124 denote components of a key scheduling part (details will be described later). Reference symbol P denotes 64-bit plaintext as an input; and C, 64-bit ciphertext as an output. Note that each extended S-box 2103 may be the same as the extended S-box 103 in FIG. 4.

The stage function has a structure in which two parallel 32-bit processing subblocks (extended S-boxes) 2103 each consisting of a two-stage SPN structure are juxtaposed, and their outputs are coupled by the MDS diffusion layer 2104. The overall basic structure is defined by repetitions of this stage function.

In the example of FIG. 28, to attain symmetric encryption and decryption processes, the final stage is constructed by only the extended S-box layer 2102 and a key adder 2105 connected to the output of the extended S-box layer 2102.

Since two stages of SPN structures are embedded in one stage of stage function, and key addition is made at the end of the process, the bit length of an extended key is $2 \times 64 \times R + 64 = 64(2R+1)$. When R=6, the bit length is $128 \times 13$ bits.

Each S-box can use either an input/output table or arithmetic process, as described above. An example of the input/output table of the 8-bit S-box are the same as that shown in FIG. 5.

An example of the internal arrangement of the extended S-box 2103 is the same as that shown in FIG. 6. The diffusion layer 113 in the extended S-box similarly uses the $MDS_L$ matrix shown in FIG. 7, and makes multiplication while regarding the S-box inputs and outputs and matrix elements as elements of a Galois field $GF(2^8)$.

The higher-level structure as the stage function of encryption of this example will be explained below.

Figure 29:
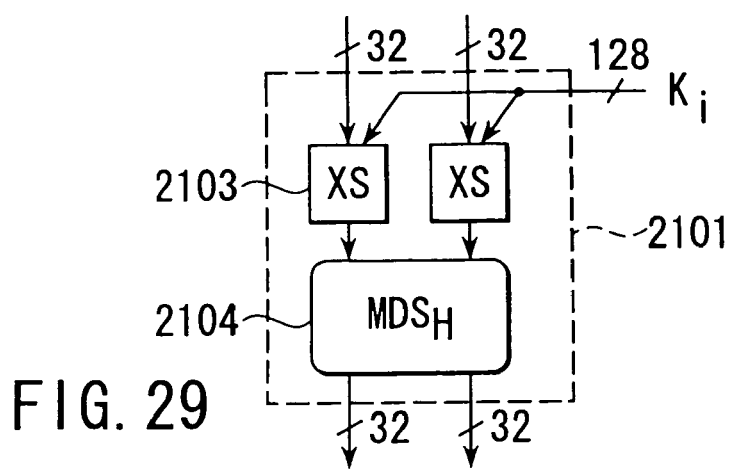
FIG. 29 shows an example of the structure of one stage of the inverse transform of a data randomizing part.

FIG. 29 shows an example of the arrangement of the portion for one stage of a randomizing part. The higher-level structure as a stage function of encryption of this example is constructed by coupling two parallel 32-bit extended S-boxes 2103 (see FIG. 6) by a diffusion layer 2104 of an MDS matrix. The diffusion layer 2104 in the higher-level structure as a stage function also uses an MDS matrix.

As for the arrangement of the higher-level MDS, methods using $GF(2^{32})$, $GF(2^4)$, $GF(2^8)$, and $GF(2^{16})$% are available as in the above description.

The higher-level MDS using $GF(2^4)$ will be explained.

Figure 30:
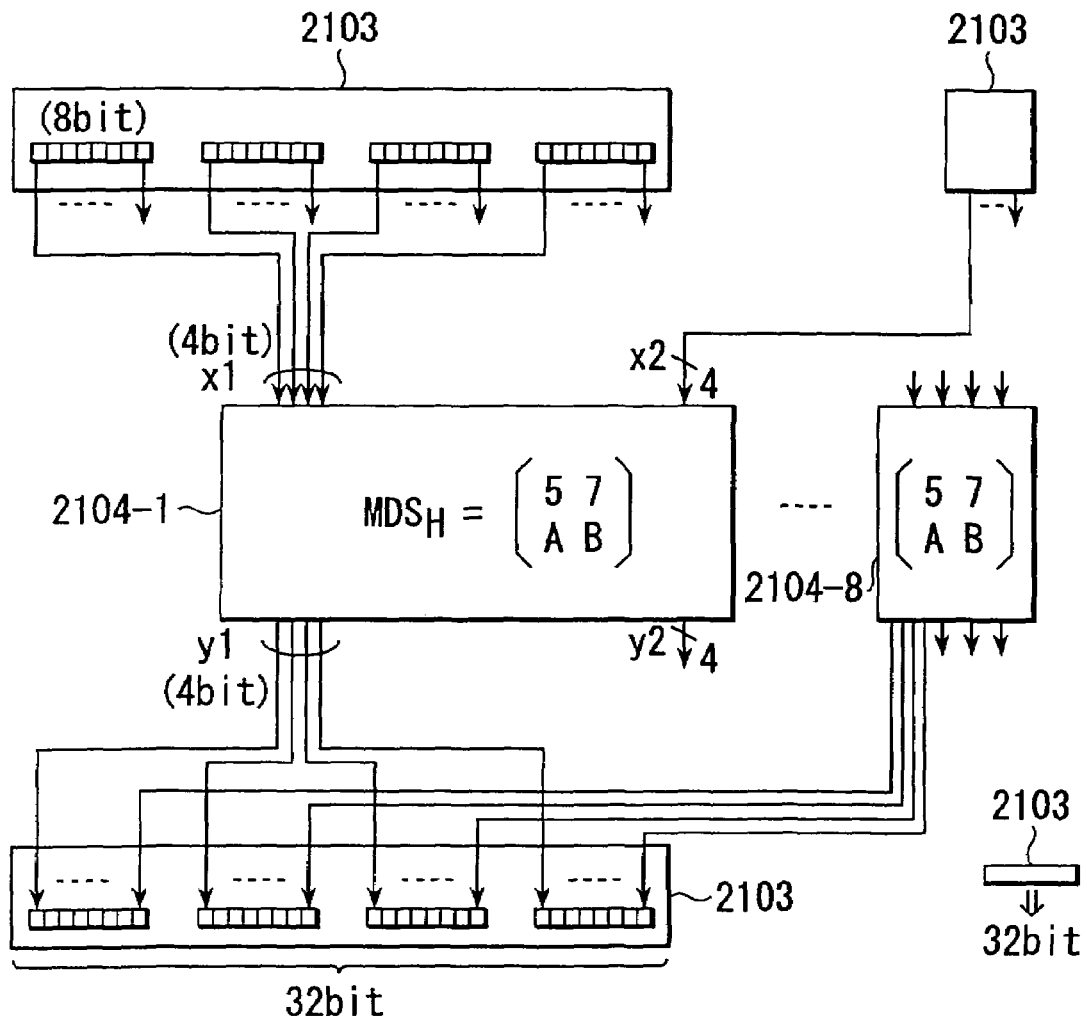
FIG. 30 shows an example of the higher-level MDS.

FIG. 30 shows an example of an MDS matrix in this case.

In this case, 1-bit data at corresponding positions (the most significant bits are exemplified in FIG. 30) of the outputs, i.e., 8-bit data of four S-boxes in one extended S-box 2103 form 4-bit data per set, and two sets of 4-bit data from one extended S-box 2103 are considered as elements of $GF(2^4)$.

A diffusion layer 2104 between two stages of two parallel extended S-box layers 2103 uses 2 (rows)×2 (columns) MDS matrices (e.g., 2104-1 in case of the most significant bits in FIG. 30) at corresponding positions of 8-bit data.

The two sets of 4-bit data as outputs are connected to corresponding positions of corresponding source 8-bit data.

Eight MDS matrices (2104-1 to 2104-8) are prepared as higher-level MDS matrices in correspondence with the bit width of S-boxes.

By table lookup in units of S-box outputs at corresponding positions of extended S-boxes (also by arithmetic operations), efficient implementation that simultaneously processes eight MDS matrices are made.

If cyclic MDS matrices are used, an efficient process that combines EX-ORing in units of 32 bits and bit rotations in units of 8 bits are performed.

Note that FIG. 30 shows as an example of the higher-level MDS matrix for the encryption apparatus:

1st row, 1st column=5, 1st row, 2nd column=7
2nd row, 1st column=A, 2nd row, 2nd column=B A corresponding higher-level MDS matrix for the decryption apparatus is described by:

1st row, 1st column=C, 1st row, 2nd column=A
2nd row, 1st column=5, 2nd row, 2nd column=B Note that the former matrix may be used for decryption, and the latter may be used for encryption.

Also, a matrix obtained by substituting rows, substituting columns, and arbitrarily transposing in an arbitrary MDS matrix may be used.

Furthermore, other higher-level MDS matrices may be used.

This higher-level MDS diffusion layer are implemented by software for executing transformation by means of a matrix arithmetic operations or input/output transformation table, but may also be implemented by hardware (an actual circuit formed on, e.g., a semiconductor substrate).

In order to implement the higher-level MDS using an actual circuit, a line connection pattern equivalent to an MDS matrix are used.

Figure 31:
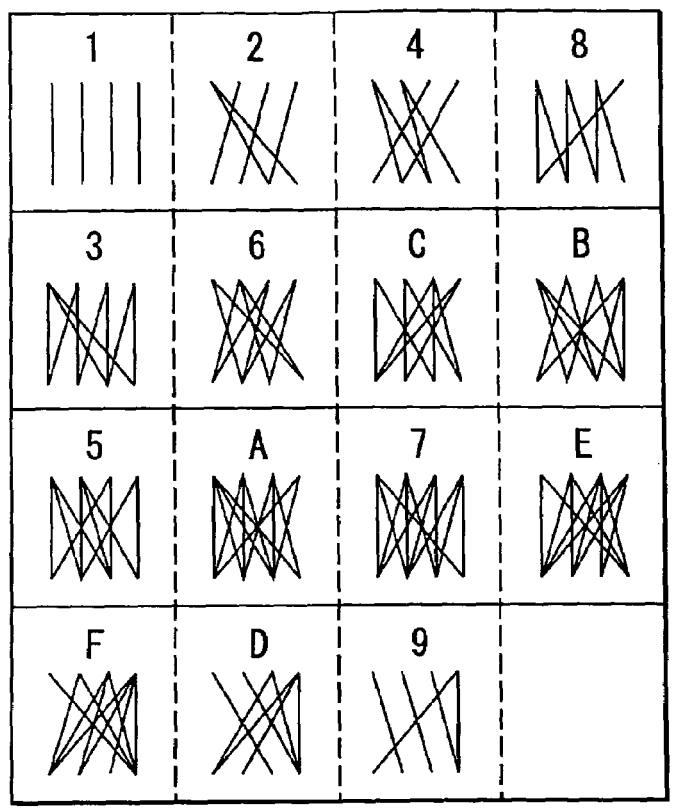
FIG. 31 shows line connection expressions of multiplication over $GF(2^4)$.

FIG. 31 shows line connection expressions (line connection patterns) of multiplication over $GF(2^4)$ in correspondence with elements 1 to F of $GF(2^4)$. Note that a coupled portion calculates an EX-OR.

More specifically, in each of the diffusion layers 2104-1 to 2104-8 in FIG. 30, line connection patterns of a portion for applying the 1st row, 1st column element of the MDS matrix to $x_1$, a portion for applying the 1st row, 2nd column element to $x_2$, a portion for applying the 2nd row, 1st column element to $x_1$, and a portion for applying the 2nd row, 2nd column element to $x_2$ can use corresponding line connection patterns of the matrix elements in FIG. 31.

Figure 32:
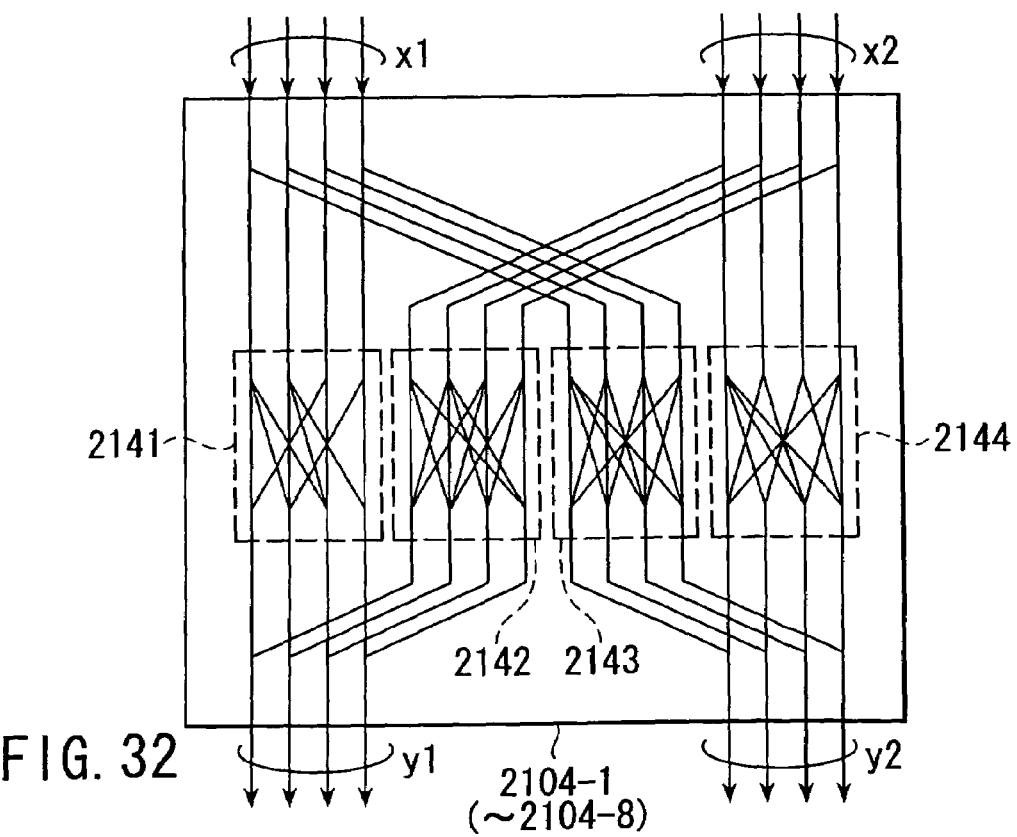
FIG. 32 shows another example of the higher-level MDS.

FIG. 32 shows an example of an actual circuit of the higher-level MDS based on the matrix exemplified in FIG. 30. In FIG. 32, reference numeral 2141 denotes a line connection pattern corresponding to the 1st row, 1st column element "5"; 2142, a line connection pattern corresponding to the 1st row, 2nd column element "7"; 2143, a line connection pattern corresponding to the 2nd row, 1st column element "A"; and 2144, a line connection pattern corresponding to the 2nd row, 2nd column element "B". At a portion where a plurality of bits are coupled, an EX-OR is calculated.

After coupling processes by EX-ORing portions corresponding to products of the matrix, coupling processes by EX-ORing portions corresponding the sums of products of the matrix are performed. Alternatively, all such coupling processes by EX-ORing may be performed simultaneously, or may be divisionally performed in a plurality of processes.

Also, the following procedure may be taken. That is, desired line connection patterns are selected from the line connection pattern group shown in FIG. 31 to form a candidate of an actual circuit arrangement of the higher-level MDS for encryption, and it is then verified if an inverse matrix (MDS matrix) of the corresponding MDS matrix is present. Of course, the matrix for decryption may be determined first.

Also, expressions other than line connection expressions (line connection patterns) of multiplication over $GF(2^4)$ may be used.

This method are applied not only to the second embodiment but also to 128-bit block encryption scheme of the first embodiment mentioned above.

Renormalization will be described below.

Fan-in of the MDS diffusion layer will be explained. In the line connection patterns shown in FIG. 31, the number of bits (the number of connected lines) which is connected to a given bit on the data output side is called "fan-in". For example, in a line connection pattern corresponding to "1", all bits have fan-in=1. On the other hand, in a line connection pattern corresponding to "5", fan-in=2, 3, 3, and 2 in turn from the left to the right bits.

A total S of fan-in values of line connection patterns of the MDS diffusion layer will be examined below. In the example shown in FIG. 32, the total S of fan-in values of 16 bits bounded by the dotted lines 2141 to 3144 is 45. The total S of fan-in values of line connection patterns of the MDS diffusion layer is preferably small since it results in an increase in the number of lines (also an increase in EX-OR arithmetic operations and the like upon matrix calculations) if it is large. In case of a 2 (rows)×2 (columns) MDS having elements of $GF(2^4)$ as its elements, the minimum value of S is 18.

As a method of reducing S, a renormalization scheme is known. This scheme can reduce the circuit volume (calculation volume upon making matrix calculations).

Figure 33:
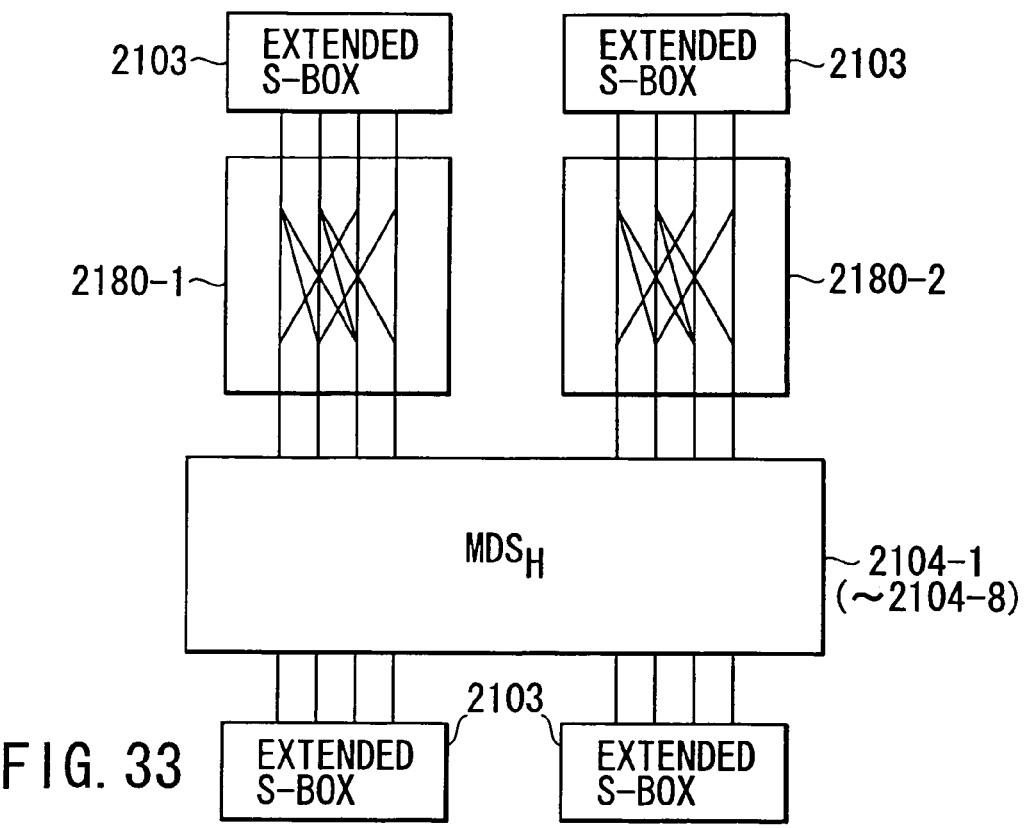
FIG. 33 is a view for explaining renormalization in the higher-level MDS.

In order to perform renormalization, pre-processing circuits 2180-1 and 2180-2 for renormalization are inserted between each of the MDS diffusion layers 2104-1 to 2104-8 and individual S-boxes on the input side, as shown in FIG. 33.

Each pre-processing circuit 2180 has one of the line connection patterns shown in FIG. 31 or makes an equivalent calculation process.

Figure 34:
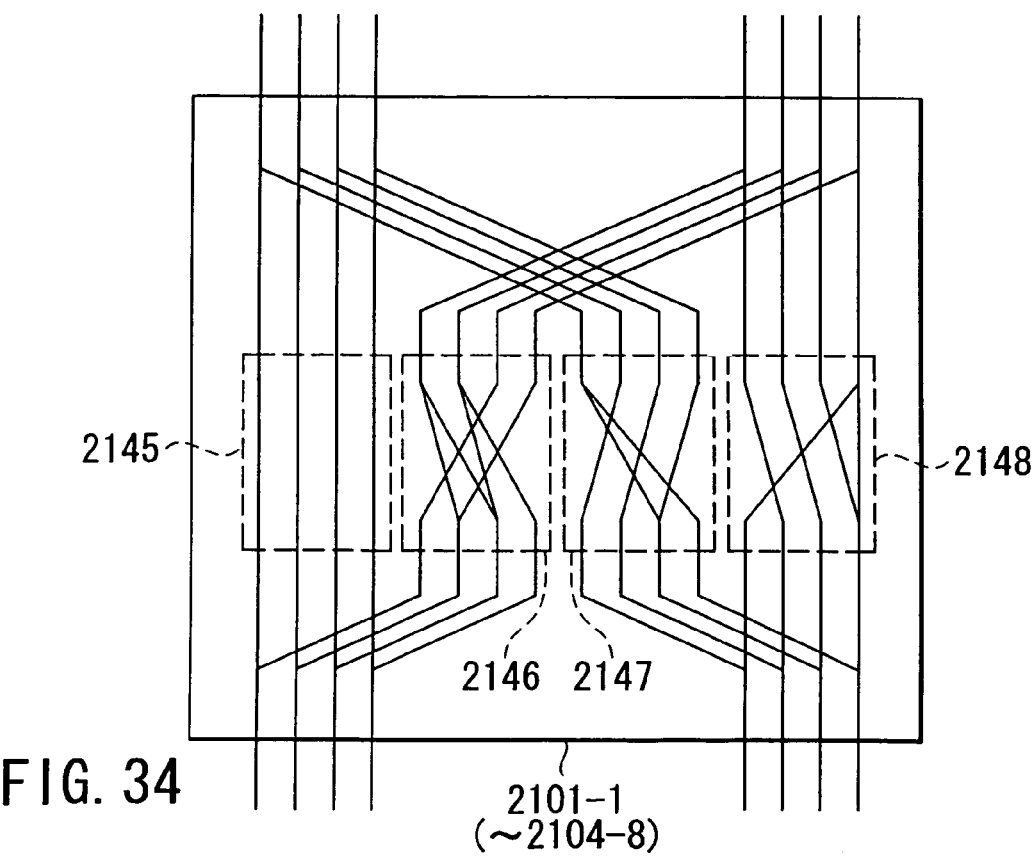
FIG. 34 shows still another example of the higher-level MDS.

FIG. 33 shows implementation by renormalization using a common factor=5 for both the S-boxes. FIG. 34 shows an example of the higher-level MDS at that time. In this case, the higher-level MDS matrix is described by:

1st row, 1st column=1, 1st row, 2nd column=4
2nd row, 1st column=2, 2nd row, 2nd column=9

In FIG. 34, reference numeral 2145 denotes a line connection pattern corresponding to the 1st row, 1st column element "1"; 2146, a line connection pattern corresponding to the 1st row, 2nd column element "4"; 2147, a line connection pattern corresponding to the 2nd row, 1st column element "2"; and 2148, a line connection pattern corresponding to the 2nd row, 2nd column element "9". A portion where a plurality of bits are coupled corresponds to an EX-OR, as described above. In this case, the value S is 20.

Higher-level diffusion in FIG. 32 is equivalent to that in FIG. 33 or FIG. 34.

As a method of obtaining a common factor and a matrix at that time upon making renormalization, for example, matrices that can attain higher-level diffusion equivalent to that of a matrix obtained without renormalization are obtained using common factors as parameters, and their fan-in values are evaluated to select a matrix to be adopted.

Note that respective S-boxes may or may not be constrained to have an identical common factor.

Upon implementation by renormalization for respective S-boxes using a common factor=B in a matrix described by:

1st row, 1st column=C, 1st row, 2nd column=A
2nd row, 1st column=5, 2nd row, 2nd column=B a higher-level MDS matrix is described by:

1st row, 1st column=9, 1st row, 2nd column=4
2nd row, 1st column=2, 2nd row, 2nd column=1

Of course, this method can also be applied to 128-bit block encryption scheme mentioned above.

Note that wiring and layouts exemplified above indicate theoretical relationships, and actual wiring and layouts have a degree of freedom in design. Eight portions 2104-1 to 2104-8 of the higher-level MDS layer may be mounted, or only some (e.g., one, two, or four) of the MDS portions 2104-1 to 2104-8 may be mounted and they may be time-divisionally shared.

The encryption and decryption apparatuses are arranged in the same way (they have only an inverse transform relationship).

Based on the same idea as described above, processing may be performed in units of 2 bits at corresponding positions of 8-bit data, and four 2 (rows)×2 (columns) MDS matrices ($GF(2^8)$) having 8-bit elements may be prepared as higher-level MDS matrices. On the other hand, processing may be performed in units of 4 bits at corresponding positions of 8-bit data, and two 2 (rows)×2 (columns) MDS matrices ($GF(2^{16})$) having 16-bit elements may be prepared as higher-level MDS matrices.

In the above description, bits at corresponding positions are extracted and processed. Alternatively, bits at different positions may be (exclusively) extracted and processed.

As in the example shown in FIG. 9, an arrangement based on a higher-level MDS matrix using $GF(2^{32})$ is also possible.

The aforementioned arrangement examples can also be applied to 128-bit block encryption scheme mentioned above.

As in the above description, in FIG. 28, all the extended S-boxes need not have the same internal arrangement, and some of them may have different arrangements.

All the higher-level MDS matrices need not have the same internal arrangement, and some of them may have different arrangements. The same applies to lower-level MDS matrices and the input/output tables of S-boxes.

For example, the first input stage and last output stage may have internal arrangements different from those of the intermediate stages.

Note that an arrangement for substituting bit positions of a plurality of S-boxes belonging to identical extended S-boxes (or inserting such circuit) at the input and output side of each higher-level MDS is also available.

In addition, various other variations are available.

Of course, the arrangement of the higher-level MDS described so far are applied to encryption and decryption apparatuses having various variations.

The key scheduling part (key generator) will be explained below.

Figure 35:
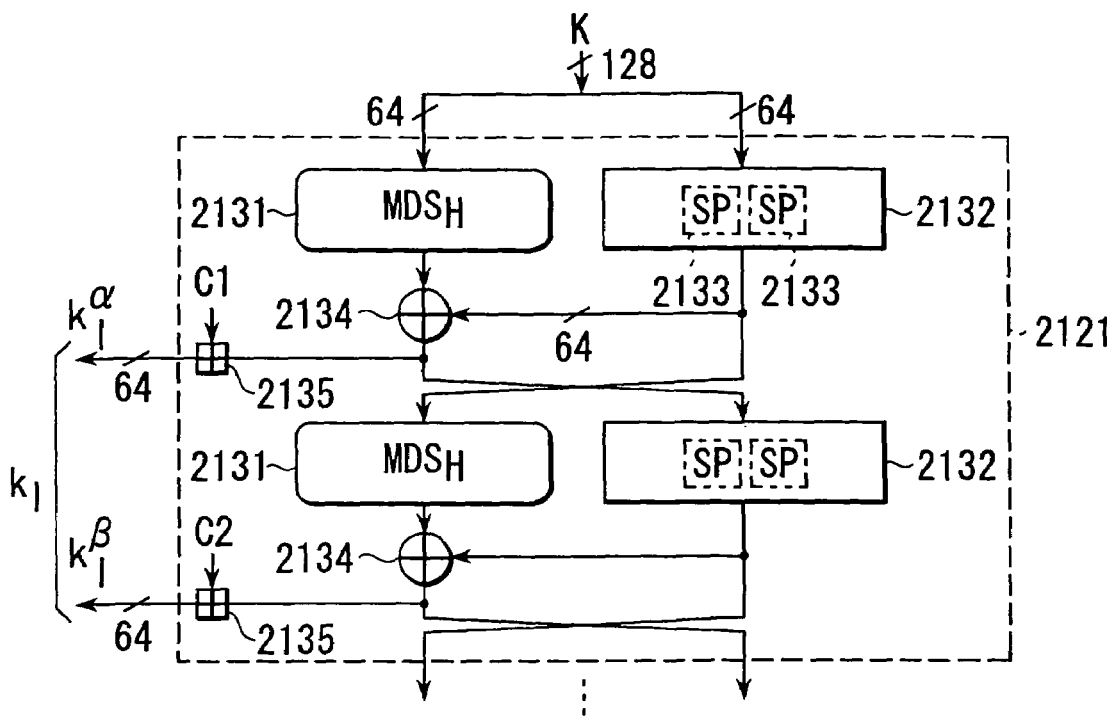
FIG. 35 is a block diagram showing still another example of the arrangement of the key scheduling part.

FIG. 35 shows an example of the arrangement of the key scheduling part. Reference numeral 2121 denotes a portion corresponding to one stage of the stage function of the data diffusion part; 2131, a linear diffusion layer (in this example, a diffusion layer using a higher-level MDS matrix); 2132, a nonlinear transformation layer (in this example, two parallel SP layers (S-box layers/diffusion layers)); 2134, an EX-OR unit; and 2135, a remainder adder. Although not shown in FIG. 35, the arrangement of the portion 2121 is repeated as needed. When the arrangement unit that outputs a 64-bit key is defined as one stage of the key scheduling part, the number of key scheduling part is (2R+1)(=13 when R=6).

In the example shown in FIG. 35, 64 bits as the left half of the output of each stage of a 128-bit modified Feistel repetitive process are extracted, and a stage number dependent constant $C_i$ is added thereto as a remainder to obtain an extended key.

When the key length is 128 bits, for example, the upper 64 bits are input to the linear diffusion layer 2131 of the first stage, and the lower 64 bits are input to the nonlinear transformation layer 2132. When the key length is 64 bits, for example, the 64 bits are input to the linear diffusion layer 2131 of the first stage, and also to the nonlinear transformation layer 2132. When the key length is 96 bits (=32 bits×3), for example, the 64 bits obtained by coupling the upper 32 bits and the intermediate 32 bits are input to the linear diffusion layer 2131 of the first stage, and 64 bits obtained by coupling the upper 32 bits and the lower 32 bits are input to the nonlinear transformation layer 2132.

Figure 36:
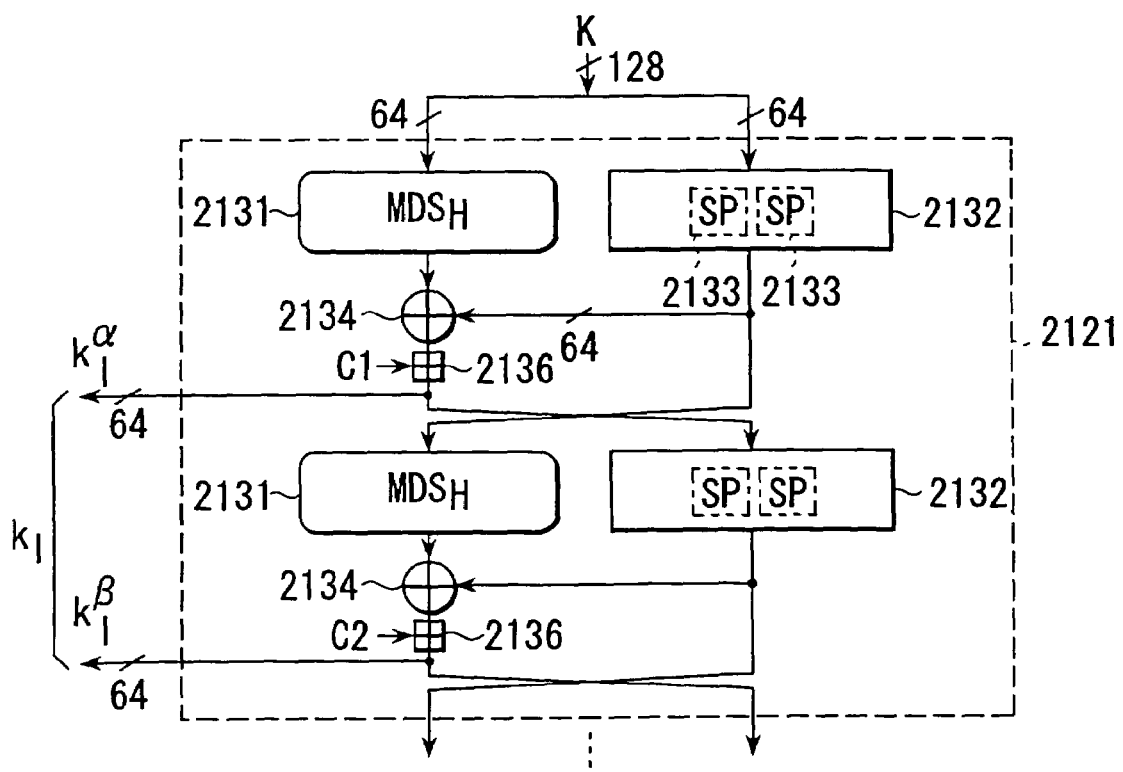
FIG. 36 is a block diagram showing still another example of the arrangement of the key scheduling part.

Note that the location of the remainder adder 136 that adds the stage number dependent constant $C_i$ as a remainder may have various variations, as shown in FIG. 36.

An example of the arrangement of each nonlinear transformation layer 2132 in FIGS. 35 and 36 is the same as that in FIGS. 13 and 14 (as in FIG. 14, constant to be EX-ORed with the input to each S-box may be a stage number dependent constant). Also, the S-box may be either the same as or different from that for the encryption processing shown in FIG. 28. The S-boxes and lower-level MDS may have different arrangements in units of stages of the key scheduling part.

An example of a method of generating different constants $C_i$ in individual stages will be explained below.

The 64-bit additive constant $C_i$ of the key scheduling part in FIGS. 35 and 36 are described by a combination of four bit constants ($H_0$, $H_1$, $H_2$, $H_3$). Examples of 32-bit constants $H_i$ are:

$H_0 = (5A827999)_H = \lfloor(\sqrt{2}/4 \times 2^{32})\rfloor$
$H_1 = (6ED9EBA1)_H = \lfloor(\sqrt{3}/4 \times 2^{32})\rfloor$
$H_2 = (8F1BBCDC)_H = \lfloor(\sqrt{5}/4 \times 2^{32})\rfloor$
$H_3 = (CA62C1D6)_H = \lfloor(\sqrt{10}/4 \times 2^{32})\rfloor$ A combination of additive constants $C_i$ is described by $C_i = (C_{i0}, C_{i1})$. In order to allow easy generation of different 64-bit constants $C_i$ in individual stages, 8-bit LFSR is used to determine a combination of $H_i$ which form $C_i$. For example, $(1D)_H$ is used in the primitive polynomial of LFSR, and $(8B)_H$ is used in the initial state of LFSR. A bit sequence generated using the LFSR is read out in units of 2 bits to determine a 32-bit constant $H_i$ used as the constant.

Figures 37, 38:
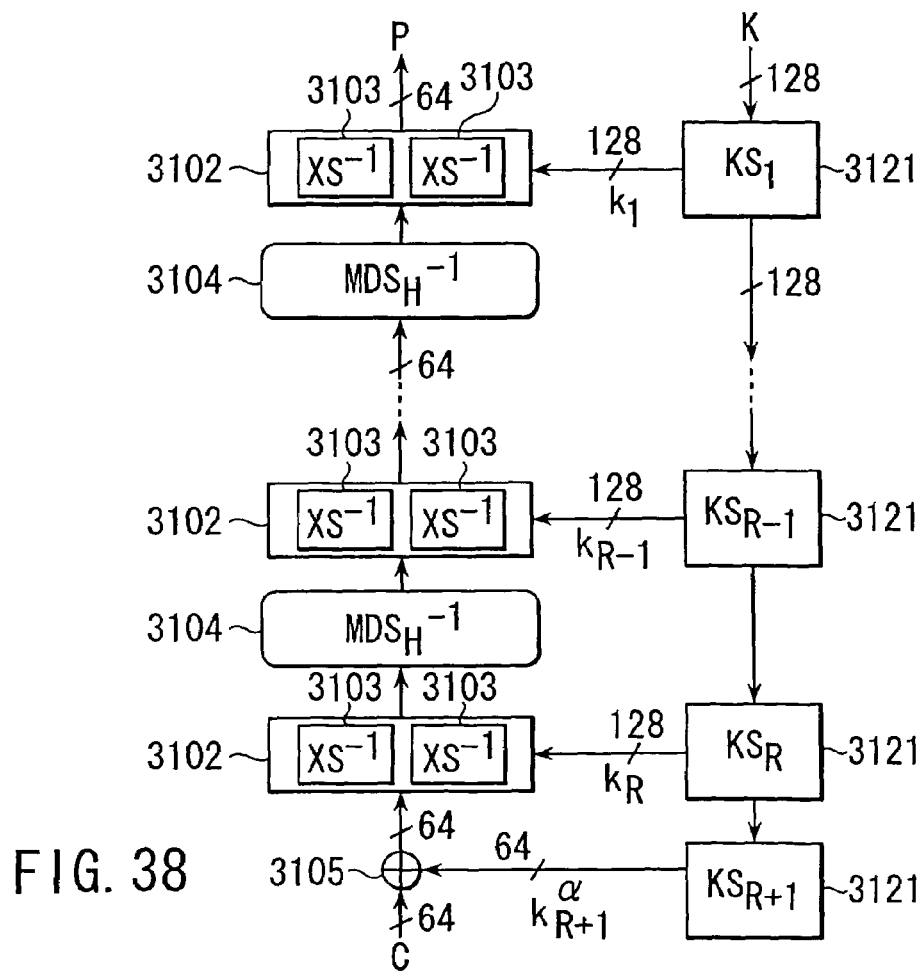
FIG. 37 shows another example of the additive constant table.
FIG. 38 is a block diagram showing another example of the decryption apparatus.

FIG. 37 shows an example of an additive constant table determined using the LFSR by the aforementioned method.

Note that the initial state of LFSR may be variable or fixed. In the former case, the initial state of LFSR partially defines the key. In the latter case, only a decryption apparatus having the same initial state of LFSR as that in the encryption apparatus can decrypt the ciphertext.

According to the aforementioned key scheduling part, in the nonlinear transformation layer, when 1 bit of the input has changed, the S-boxes can spread that change to 8 bits, and the lower-level MDS can spread the change to 32 bits. Furthermore, in the linear diffusion layer, since the higher-level MDS largely diffuses the output from the nonlinear transformation layer of the previous state, a 1-bit difference are spread to the 64-bit width.

Therefore, according to the key scheduling part, the respective stages can easily generate, i.e., diffuse random keys. Since different constants are used in units of stages, keys rarely match among stages (keys nearly do not match).

Note that the key scheduling part may have another arrangement.

Note that the linear diffusion device and Galois field multiplier that have been explained with reference to FIGS. 16 to 18 can also be applied to this case.

The MDS matrix generation section (or random generation algorithm) that has been explained with reference to FIGS. 19 to 22 can also be applied to this case.

Of course, the design method of a combination of S-box and MDS that has been explained with reference to FIG. 23 can also be applied to this case.

The decryption apparatus will be explained below.

The decryption apparatus basically has a structure obtained by reversing that of the encryption apparatus (the same key is used).

FIG. 38 shows an example of the arrangement of a decryption apparatus corresponding to the encryption apparatus shown in FIG. 28.

Figure 39:
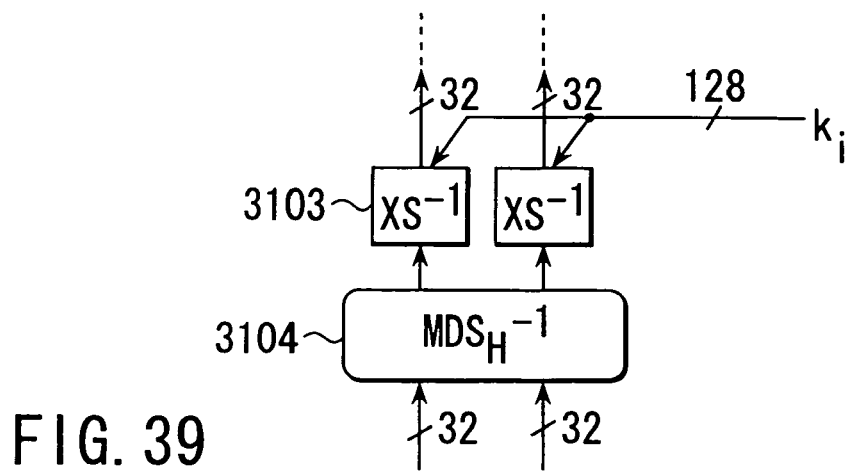
FIG. 39 shows another example of the structure of one stage of the inverse transform of the data randomizing part.

FIG. 39 shows another example of the structure of one stage of the inverse transform of the data randomizing part of FIG. 28 which stage corresponds to that shown in FIG. 29.

An example of the arrangement corresponding to the lower-level structure (see FIG. 6) in FIG. 28 is the same as that shown in FIG. 25.

In FIG. 38, a key scheduling part of the decryption apparatus has the same arrangement as that of the encryption apparatus shown in FIG. 28.

The input/output table of each S-box (see 1112 in FIG. 25), a lower-level MDS matrix of each lower-level MDS (see 1113 in FIG. 25), and a higher-level MDS matrix of a higher-level MDS 3104 are inverse functions (inverse matrices) of the input/output table of each S-box (see 1112 in FIG. 6), the lower-level MDS matrix of each lower-level MDS (see 113 in FIG. 6), and the higher-level MDS matrix of the higher-level MDS 3104 in the encryption apparatus.

In FIG. 38, the key is generated in the same order as in FIG. 28, but may be generated in an order opposite to FIG. 28.

Figure 40:
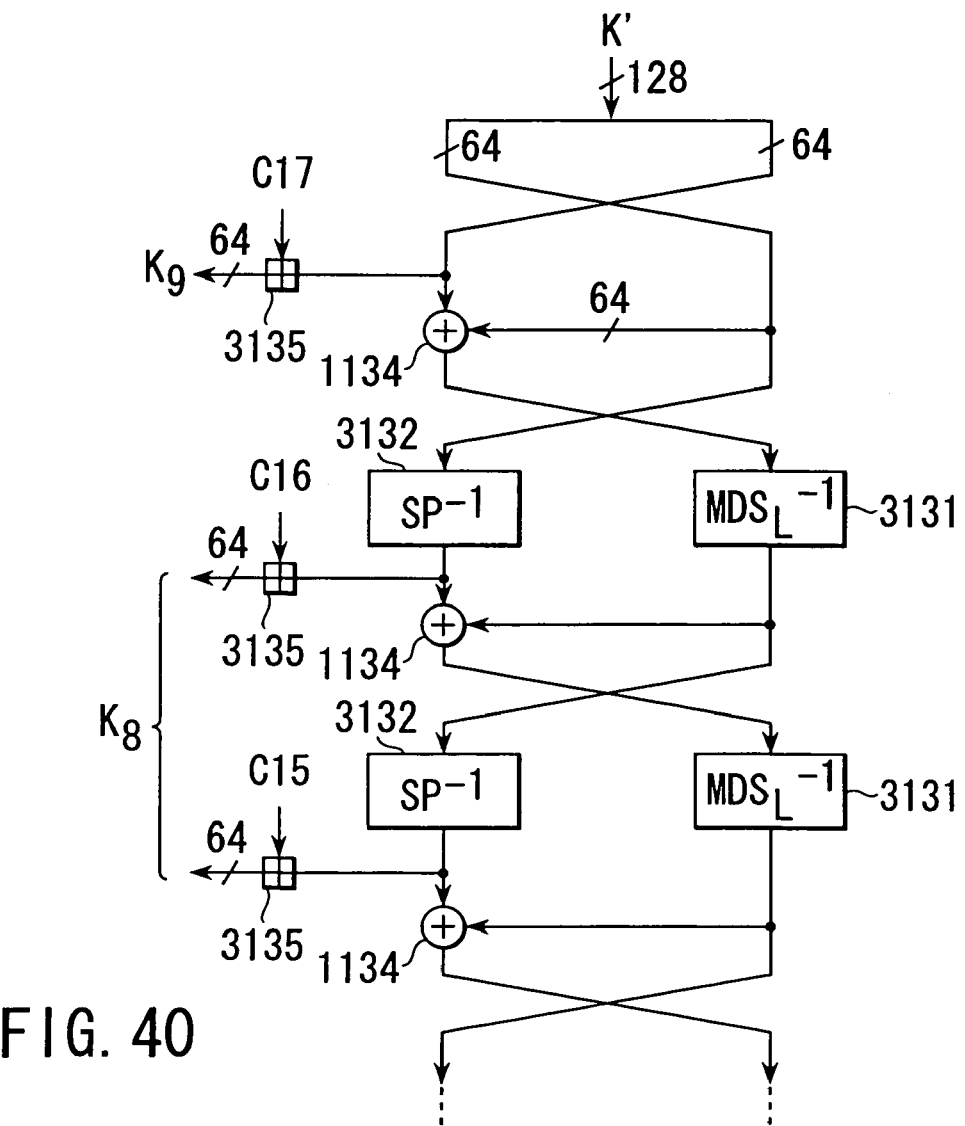
FIG. 40 is a block diagram showing still another example of the arrangement of the key scheduling part at the time of decryption.

FIG. 40 shows an example of the arrangement of the key scheduling part in such case.

Reference numeral 3132 denotes inverse transform of the nonlinear transformation layer 2132 of FIG. 35 (including four parallel inverse transforms of SP layers 2133 (e.g., the inputs and outputs in FIG. 13 or FIG. 14 are reversed)).

The input/output table of each S-box, lower-level MDS matrix, and higher-level MDS matrix used in the key scheduling part shown in FIG. 40 are inverse functions (inverse matrices) of those used in the key scheduling part in FIG. 35.

Assume that a decryption key input K' in FIG. 40 is the key used in the last key addition in FIG. 28 (for encryption).

In this case as well, various variations of the locations where the stage number dependent constants $C_i$ are added as remainders are available in addition to the same method as in FIG. 36.

In the above description, 128-bit block encryption scheme and 64-bit block encryption scheme have been exemplified, but the present invention are applied to block encryption scheme of other bit lengths.

The hardware arrangement and software arrangement of this embodiment will be explained below.

The encryption and decryption apparatuses of this embodiment are implemented by either hardware or software.

Upon software implementation, this embodiment are applied to a computer readable recording medium which records a program which implements the encryption or decryption apparatus and makes a computer execute predetermined means (or makes a computer function as predetermined means, or makes a computer implement predetermined functions).

Upon hardware implementation, the encryption or decryption apparatus are formed as a semiconductor device.

When an encryption or decryption apparatus to which the present invention is applied is constructed, or when an encryption or decryption program is prepared, all blocks or modules exemplified in FIGS. 4 and 24 may be individually created. Alternatively, one or an appropriate number of blocks or modules having identical arrangement may be prepared, and may be shared (commonly used) by respective portions of the algorithm.

In case of software implementation, multi-processors may be used to execute parallel processes, thus achieving high-speed processing.

Note that an apparatus which has an encryption function but no decryption function, an apparatus which has a decryption function but no encryption function, or an apparatus which has both the encryption and decryption functions are constructed. Likewise, a program which has an encryption function but no decryption function, a program which has a decryption function but no encryption function, or a program which has both the encryption and decryption functions are prepared.

Applications of this embodiment to systems will be explained below.

The encryption system of this embodiment are basically applied to every systems.

Figure 41:
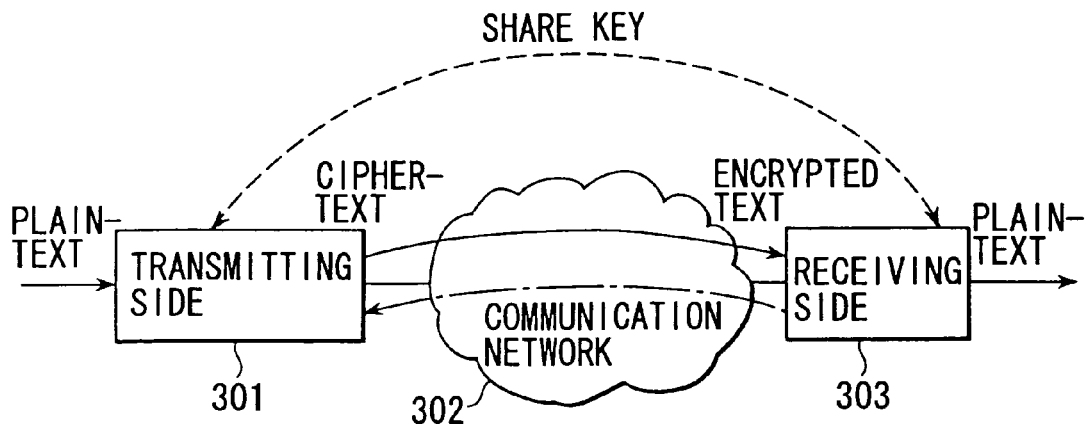
FIG. 41 is a block diagram showing an example of a system using the encryption apparatus of the present invention.

For example, as shown in FIG. 41, a key is securely shared between a transmitting apparatus 301 and receiving apparatus 303 by a predetermined method or procedure. The transmitting apparatus 301 encrypts transmission data in units of block length by the encryption system of this embodiment, and transmits encrypted data to the receiving apparatus 303 via a communication network 302 in accordance with a predetermined protocol. Upon receiving encrypted data, the receiving apparatus 303 decrypts the received encrypted data in units of block lengths by the encryption system of this embodiment to reproduce original plaintext. Note that when these apparatuses have both the encryption and decryption functions, they can make two-way encryption communications.

Figure 42:
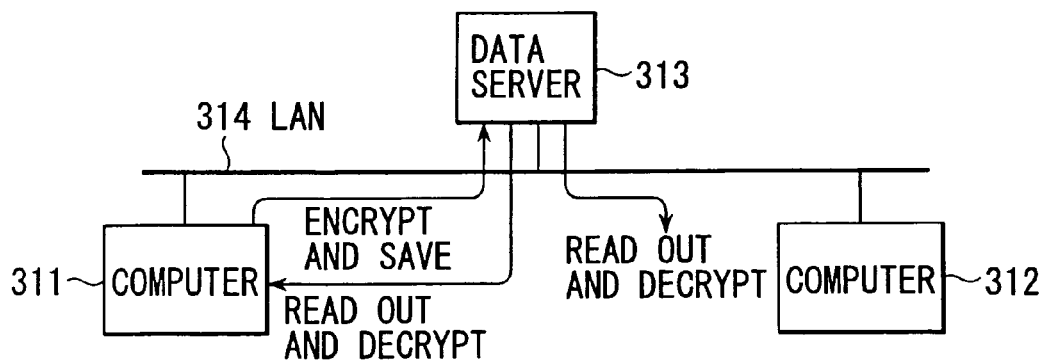
FIG. 42 is a block diagram showing another example of the system using the encryption apparatus of the present invention.

For example, as shown in FIG. 42, a computer 311 generates a key by a predetermined method, encrypts data to be saved in units of block lengths by the encryption system of this embodiment, and saves the encrypted data in a data server 313 via a predetermined network (e.g., a LAN, Internet, or the like) 314. Upon reading the saved data, the computer 311 reads desired encrypted data from the data server 313, and decrypts the read data in units of block lengths by the encryption system of this embodiment to reproduce original plaintext. If another computer 312 knows this key, it can similarly decrypt and reproduce plaintext. However, other computers which do not know the key cannot decrypt the encrypted data, thus achieving security control of information.

Figure 43:
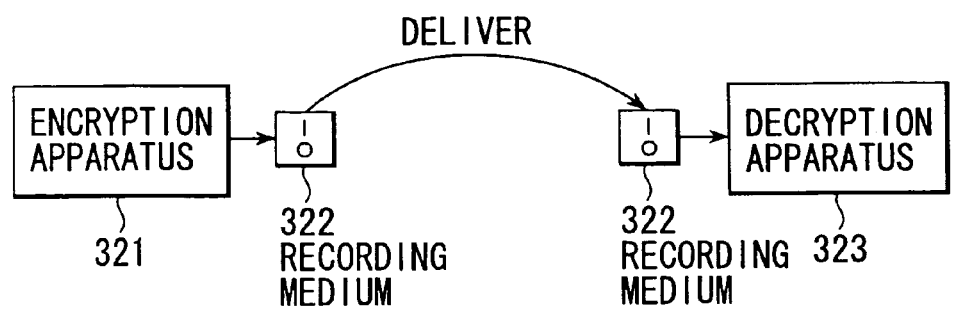
FIG. 43 is a block diagram showing still another example of the system using the encryption apparatus of the present invention.

For example, as shown in FIG. 43, for the contents provider, an encryption apparatus 321 encrypts given contents using a given key in units of block lengths by the encryption system of this embodiment, records the encrypted contents in recording media 322, and delivers these media to users. The user who acquired the recording medium 322 acquires the key by a predetermined method, and decrypts the contents in units of block lengths by the encryption system of this embodiment using a decryption apparatus 323, thus browsing or playing back the contents.

Also, the present invention are applied to various other systems.

Note that the arrangements described in this embodiment are merely examples, and do not exclude other arrangements, and other arrangements obtained by replacing some components of the exemplified arrangement by other ones, omitting some components of the exemplified arrangement, adding other functions to the exemplified arrangement, or combining them are also available. Also, another arrangement theoretically equivalent to the exemplified arrangement, another arrangement including portions theoretically equivalent to the exemplified arrangement, another arrangement theoretically equivalent to principal part of the exemplified arrangement, and the like are available. Furthermore, another arrangement that achieves the same or similar objects as or to that of the exemplified arrangement, another arrangement that can provide the same or similar effects as or to those of the exemplified arrangement, and the like are available.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for encrypting block data, comprising:
a memory configured to store the block data;
first processing units of stages and a second processing unit, wherein the first processing units of stages includes at least a first processing unit of a first stage and first processing units of a second and subsequent stages,
wherein
the first processing unit of a first stage inputs plain data with a first data width,
the first processing units of a second and subsequent stages input processed data with the first data width which are output from first processing units of preceding stages,
each of the first processing units includes first units and a second unit,
the first units executes a nonlinear transform processing with respect to each data with a second data width which is generated by dividing the plain data with the first data width,
the second unit executes a linear diffusion processing with respect to data with the first data width composed of the data with the second data width output from the first units;
the second processing unit inputs data with the first data width output from the first processing unit of a last stage,
the second processing unit includes third units and an encrypted data outputting unit,
the third units executes the nonlinear transform processing with respect to each data with the second data width which is generated by dividing the data with the first data width output from the first processing unit of the last stage,
the encrypted data outputting unit outputs encrypted data of the plain data based on data with the first data width composed of the data with the second data width output from the third units, and
each of the first units and the third units comprises:
nonlinear transform processing units for executing the nonlinear transform processing with respect to each data with a third data width which is generated by dividing the data with the second width;
a linear diffusion processing unit for executing the linear diffusion processing with respect to data with the second data width composed of the data with the third data width output from the nonlinear transform processing units; and
second nonlinear transform processing units for executing the nonlinear transform processing with respect to each data with a third data width which is generated by dividing the data with the second width output from the linear diffusion processing unit.

2. The apparatus for encrypting block data according to claim 1, wherein the second unit calculates output data with the first data width from the data with the first data width using a pre-selected Maximum Distance Separable matrix.

3. The apparatus for encrypting block data according to claim 2, wherein only predetermined lower bits of all elements of the Maximum Distance Separable matrix are nonzero.

4. The apparatus for encrypting block data according to claim 2, wherein all elements on one row of the Maximum Distance Separable matrix have different values.

5. The apparatus for encrypting block data according to claim 2, wherein the second unit executes a process of sampling 1-bit data every a predetermined number of data from the data with the first data width, connects the sampled data, and calculates output data from the connected sampled data used as the input data, using the Maximum Distance Separable matrix; and the second unit executes the process for all cases having different positions where 1-bit data is sampled.

6. The apparatus for encrypting block data according to claim 1, wherein the linear diffusion processing unit calculates output data with the second data width from the data with the second data width using a pre-selected Maximum Distance Separable matrix.

7. A method of encrypting block data in an apparatus for encrypting block data which includes first processing units of stages and a second processing unit, wherein the first processing units of stages includes at least a first processing unit of a first stage and first processing units of a second and subsequent stages, said method comprising:

inputting plain data with a first data width;

by the first processing unit of a first stage, executing a nonlinear transform processing with respect to each data with a second data width, which is generated by dividing the plain data with the first data width, and executing a linear diffusion processing with respect to data with the first data width composed of the nonlinear transformed data with the second data width;

by each of the first processing units of stages other than the first stage, inputting data with the first data width that is outputted from the first processing units of preceding stages, executing the nonlinear transform processing with respect to each data with the second data width which is generated by dividing the input data with the first data width, and executing the linear diffusion processing with respect to data with the first data width composed of the nonlinear transformed data with the second data width; and by the second processing unit, inputting data with the first data width that is outputted from the first processing unit of a last stage, executing the nonlinear transform processing with respect to each data with the second data width which is generated by dividing the input data with the first data width, and outputting encrypted data of the plain data, on the basis of data with the first data width composed of the nonlinear transformed data with the second data width, the nonlinear transforming steps by the first processing units and the second processing unit comprising steps of:

executing the nonlinear transform processing with respect to each data with a third data width which is generated by dividing the nonlinear transformed data with the second data width;

executing the linear diffusion processing with respect to data with the second data width composed of the nonlinear transformed data with the third data width; and executing the nonlinear transform processing with respect to each data with the third data width which is generated by dividing the linear diffused data with the second data width.

8. A computer program product configured to cause a computer to function as an apparatus for encrypting block data including a first processing units of stages and second processing unit, wherein the first processing units of stages includes at least a first processing unit of a first stage and first processing units of a second and subsequent stages, the computer program product comprising a computer readable medium and a program stored in the medium, the program causing the computer to execute the steps of:

inputting plain data with a first data width;

by the first processing unit of a first stage, executing a nonlinear transform processing with respect to each data with a second data width which is generated by dividing the plain data with the first data width, and a linear diffusion processing with respect to data with the first data width composed of the nonlinear transformed data with the second data width;

by each of the first processing units of each stage, inputting data with the first data width output from the first processing units of preceding stages, executing the nonlinear transform processing with respect to each data with the second data width which is generated by dividing the input data with the first data width, and executing the linear diffusion processing with respect to data with the first data width composed of the nonlinear transformed data with the second data width; and by the second processing unit, inputting data with the first data width output from the first processing unit of the last stage, executing the nonlinear transform processing with respect to each data with the second data width which is generated by dividing the input data with the first data width, and outputting encrypted data of the plain data, on the basis of data with the first data width composed of the nonlinear transformed data with the second data width, the nonlinear transforming step by the first processing units and the second processing unit comprising steps of:

executing the nonlinear transform processing with respect to each data with a third data width which is generated by dividing the nonlinear transformed data with the second data width;

executing the linear diffusion processing with respect to data with the second data width composed of the nonlinear transformed data with the third data width; and executing the nonlinear transform processing with respect to each data with the third data width which is generated by dividing the linear diffused data with the second data width.

9. An apparatus for decrypting encrypted block data, comprising:

a memory configured to store the block data;

a first processing unit and second processing units of stages, wherein the second processing units of stages includes at least a second processing unit of a first stage and second processing units of a second and subsequent stages, wherein the first processing unit inputs encrypted data with a first data width, the first processing unit includes first units for executing a nonlinear transform processing with respect to each data with a second data width which is generated by dividing the encrypted data with the first data width, and the second processing unit of a first stage inputs data with the first data width output from the first processing unit, the second processing units of a second and subsequent stages input data with the first data width output from the second processing units of preceding stages, each of the second processing units includes a second unit and third units, the second unit executes a linear diffusion processing with respect to the data with the first data width output from the first processing unit, the third units execute the nonlinear transform processing with respect to each data with the second data width which is generated by dividing the data with the first data width output from the second unit, the third units of stages, other than a last stage, outputs to next stages, data with the first data width composed of the nonlinear transformed data with the second data width, the third unit of the last stage outputs data with the first data width composed of the nonlinear transformed data with the second data width as plain data of the encrypted data, each of the first units and the third units includes:

nonlinear transform processing units for executing the nonlinear transform processing with respect to each data with a third data width which is generated by dividing the data with the second width;

a linear diffusion processing unit for executing the linear diffusion processing with respect to data with second data width composed of the data with the third data width output from the nonlinear transform processing units; and second nonlinear transform processing units for executing the nonlinear transform processing with respect to each data with a third data width which is generated by dividing the data with the second width output from the linear diffusion processing unit.

10. A method of decrypting encrypted block data in an apparatus for decrypting encrypted block data which includes a first processing unit and second processing units of stages, wherein the second processing units of stages includes at least a second processing unit of a first stage and second processing units of a second and subsequent stages, said method comprising steps of:

inputting encrypted data with a first data width;

by the first processing unit, executing a nonlinear transform processing with respect to each data with a second data width which is generated by dividing the encrypted data with the first data width;

by the second processing unit of a first stage, inputting data with the first data width output from the first processing unit, executing a linear diffusion processing with respect to the input data with the first data width, and executing the nonlinear transform processing with respect to each data with the second data width which is generated by dividing the linear diffused data with the first data width;

by the second processing units of stages other than the first stage and the last stage, inputting data with the first data width output from the second processing units of preceding stages, executing the linear diffusion processing with respect to the input data with the first data width, and executing the nonlinear transform processing with respect to each data with the second data width which is generated by dividing the linear diffused data with the first data width; and by the second processing unit of the last stage, inputting data with the first data width output from the second processing unit of a preceding stage, executing the linear diffusion processing with respect to the input data with the first data, executing the nonlinear transform processing with respect to each data with the second data width which is generated by dividing the linear diffused data with the first data width, and outputting data with the first data width composed of the nonlinear transformed data with the second data width as plain data of the encrypted data, the nonlinear transforming step by the first processing unit and the second processing units comprising steps of:

executing the nonlinear transform processing with respect to each data with a third data width which is generated by dividing the data with the second data width;

executing the linear diffusion processing with respect to data with the second data width composed of the nonlinear transformed data with the third data width; and executing the nonlinear transform processing with respect to each data with the third data width which is generated by dividing the linear diffused data with the second data width.

11. A computer program product configured to cause a computer to function as an apparatus for encrypting block data including a first processing unit and a second processing units of stages, wherein the second processing units of stages includes at least a second processing unit of a first stage and second processing units of a second and subsequent stages, the computer program product comprising a computer readable medium and a program stored in the medium, the program causing the computer to execute the steps of:

inputting encrypted data with a first data width;

by the first processing unit, executing a nonlinear transform processing with respect to each data with a second data width which is generated by dividing the encrypted data with the first data width;

by the second processing unit of a first stage, inputting data with the first data width output from the first processing unit, executing a linear diffusion processing with respect to the input data with the first data width, and executing the nonlinear transform processing with respect to each data with the second data width which is generated by dividing the linear diffused data with the first data width;

by the second processing units of stages other than the first stage and the last stage, inputting data with the first data width output from the second processing units of preceding stages, executing the linear diffusion processing with respect to the input data with the first data width, and executing the nonlinear transform processing with respect to each data with the second data width which is generated by dividing the linear diffused data with the first data width; and by the second processing unit of the last stage, inputting data with the first data width output from the second processing unit of a preceding stage, executing the linear diffusion processing with respect to the input data with the first data, executing the nonlinear transform processing with respect to each data with the second data width which is generated by dividing the linear diffused data with the first data width, and outputting data with the first data width composed of the nonlinear transformed data with the second data width as plain data of the encrypted data, the nonlinear transforming step by the first processing unit and the second processing units comprising steps of:

executing the nonlinear transform processing with respect to each data with a third data width which is generated by dividing the data with the second data width;

executing the linear diffusion processing with respect to data with the second data width composed of the nonlinear transformed data with the third data width; and executing the nonlinear transform processing with respect to each data with the third data width which is generated by dividing the linear diffused data with the second data width.

* * * * *